(12) United States Patent
Han et al.

(10) Patent No.: US 12,422,706 B2
(45) Date of Patent: Sep. 23, 2025

(54) VIEWING ANGLE VARYING FILM AND DISPLAY DEVICE COMPRISING THE SAME

(71) Applicant: LG Display Co., Ltd., Seoul (KR)

(72) Inventors: JaeJung Han, Incheon (KR); HyukJoon Yoon, Goyang-si (KR); SeMin Lee, Seoul (KR); SeungJu Gwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/799,691

(22) Filed: Aug. 9, 2024

(65) Prior Publication Data
US 2025/0130452 A1  Apr. 24, 2025

(30) Foreign Application Priority Data

Oct. 24, 2023  (KR) .......................... 10-2023-0142730

(51) Int. Cl.
| | |
|---|---|
| *G02F 1/13* | (2006.01) |
| *G02F 1/1337* | (2006.01) |
| *G02F 1/1343* | (2006.01) |
| *G02F 1/1335* | (2006.01) |
| *G02F 1/13357* | (2006.01) |

(52) U.S. Cl.
CPC ...... *G02F 1/1323* (2013.01); *G02F 1/133769* (2021.01); *G02F 1/134363* (2013.01); *G02F 1/133504* (2013.01); *G02F 1/133524* (2013.01); *G02F 1/133603* (2013.01)

(58) Field of Classification Search
CPC ............ G02F 1/1323; G02F 1/133769; G02F 1/134363; G02F 1/133504; G02F 1/133524; G02F 1/133603
See application file for complete search history.

(56) References Cited

U.S. PATENT DOCUMENTS

| | | | |
|---|---|---|---|
| 2022/0206335 A1* | 6/2022 | Choi ..................... | G02F 1/1675 |
| 2022/0260883 A1* | 8/2022 | Shin ....................... | G02F 1/155 |

FOREIGN PATENT DOCUMENTS

KR  10-2021-0013854 A  2/2021

* cited by examiner

*Primary Examiner* — Donald L Raleigh
(74) *Attorney, Agent, or Firm* — Fenwick & West LLP

(57) ABSTRACT

Provided is a viewing angle varying film. The viewing angle varying film includes a first film, a second film that overlaps the first film and is spaced apart from the first film, a first electrode on the first film, a second electrode on the second film, and a viewing angle varying layer between the first electrode and the second electrode. The viewing angle varying layer includes a plurality of first structures and a plurality of second structures including colored particles and are spaced apart from each other. At least one or more of a height, a width, and a shape of the plurality of first structures and the plurality of second structures is different. Accordingly, various viewing field characteristics may be satisfied.

25 Claims, 31 Drawing Sheets

VIEWING ANGLE VARYING FILM AND DISPLAY DEVICE COMPRISING THE SAME

CROSS-REFERENCE TO RELATED APPLICATION

This application claims the priority of Republic of Korea Patent Application No. 10-2023-0142730 filed on Oct. 24, 2023, which is hereby incorporated by reference in its entirety.

BACKGROUND

Field

The present disclosure relates to a viewing angle varying film and a display device including the same, and more particularly, to a viewing angle varying film which satisfies various viewing field characteristics and a display device including the same.

Description of the Related Art

In accordance with the increased demand for personal privacy protection, various related products are being developed in various fields. Among products that guarantee the personal privacy, a demand for a viewing angle varying film which is attached to various displays such as a cellular phone, a tablet personal computer (PC), a monitor, or a display for a vehicle to block lateral light transmission and narrows a viewing angle and a display device including the same is increasing year by year.

With regard to this, in the related art, a film type viewing angle varying film in which a light transmissive area through which light is transmitted and a light blocking area which blocks light in a specific direction are alternately formed has been used. The viewing angle varying film of the related art includes a transmissive area and a light blocking area which is disposed between the transmissive areas to block or absorb the light. The light blocking area includes a black pigment. Light having an incident angle which is equal to or larger than a predetermined angle, among light incident from the lower portion, is absorbed or blocked by light blocking areas which are repeatedly formed so that the light cannot pass through the viewing angle varying film. By doing this, at a viewing angle which is equal to or larger than a predetermined angle, light transmittance is significantly reduced so that the screen is not visible. However, the viewing angle varying film of the related art has inconvenience in that if the film itself is not removed, the viewing angle is not restored to the existing state so that the film needs to be removed.

SUMMARY

Another object to be achieved by the present disclosure is to provide a viewing angle varying film and a display device which satisfy various viewing field characteristics.

An object to be achieved by the present disclosure is to provide a viewing angle varying film which is applicable to various display devices.

Objects of the present disclosure are not limited to the above-mentioned objects, and other objects, which are not mentioned above, can be clearly understood by those skilled in the art from the following descriptions.

In one embodiment, a viewing angle varying film comprises: a first film; a second film that overlaps the first film and is spaced apart from the first film; a first electrode on the first film; a second electrode on the second film such that the second electrode is between the second film and the first electrode; and a viewing angle varying layer between the first electrode and the second electrode, the viewing angle varying layer including a plurality of first structures and a plurality of second structures that are spaced apart from each other and each of the plurality of first structures and each of the plurality of second structures including colored particles, wherein at least one or more of a height, a width, or a shape of a first structure from the plurality of first structures is respectively different from a height, a width, or a shape of a second structure from the plurality of second structures. Accordingly, various viewing field characteristics may be satisfied.

In one embodiment, a display device comprises: a display panel configured to emit light; and a viewing angle varying film on the display panel, the viewing angle varying film including a plurality of first structures and a plurality of second structures that are spaced apart from each other, and each of the plurality of first structures and each of the plurality of second structures including colored particles, wherein in a first mode of the display device, the plurality of first structures and the plurality of second structures are configured to block the light emitted by the display panel from passing through the plurality of first structures and the plurality of second structures, wherein in a second mode of the display device, the plurality of first structures and the plurality of second structures are configured to allow the light emitted by the display panel to pass through the plurality of first structures and the plurality of second structures, and wherein in a third mode of the display device, at least one first structure from the plurality of first structures or at least one second structure from the plurality of second structures is configured to allow the light emitted by the display panel to pass through the at least one first structure or the at least one second structure at a first viewing angle, and the other one of the at least one first structure or the at least one second structure is configured to block the light emitted by the display panel.

Other detailed matters of the exemplary embodiments are included in the detailed description and the drawings.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
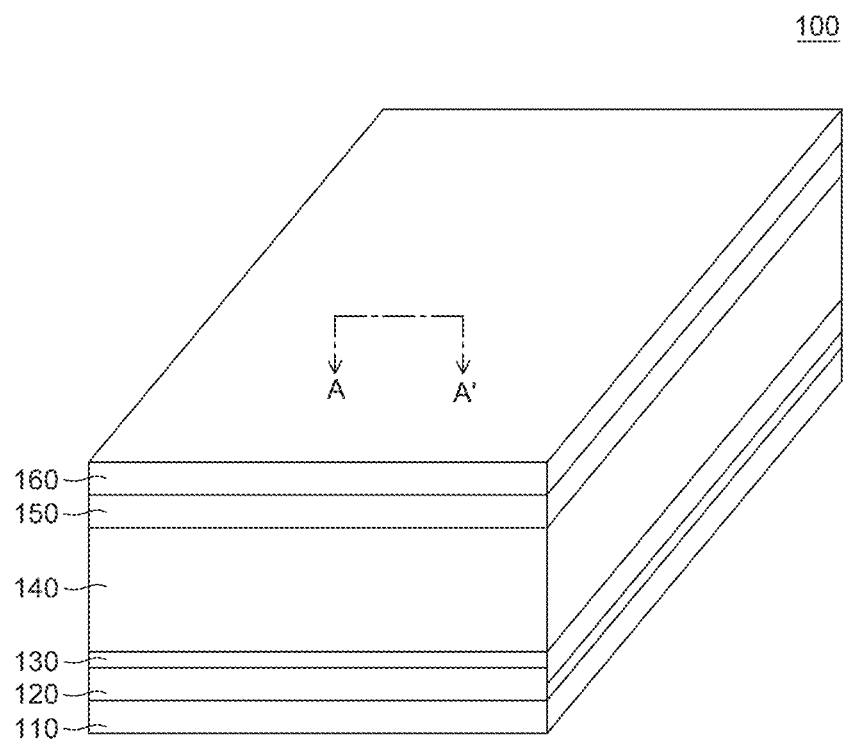
FIG. 1 is a perspective view of a viewing angle varying film according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a viewing angle varying film and a display device comprising the same according to exemplary embodiments of the present disclosure will be described in detail with reference to accompanying drawings.

Figure 2:
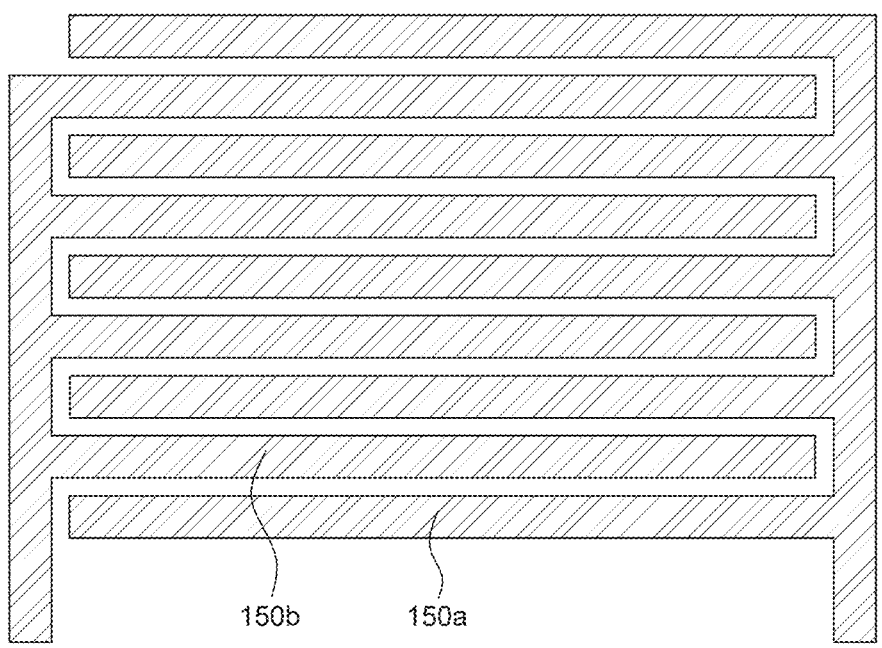
FIG. 2 is a plan view of a second electrode of a viewing angle varying film according to an exemplary embodiment of the present disclosure.
Figure 3A:
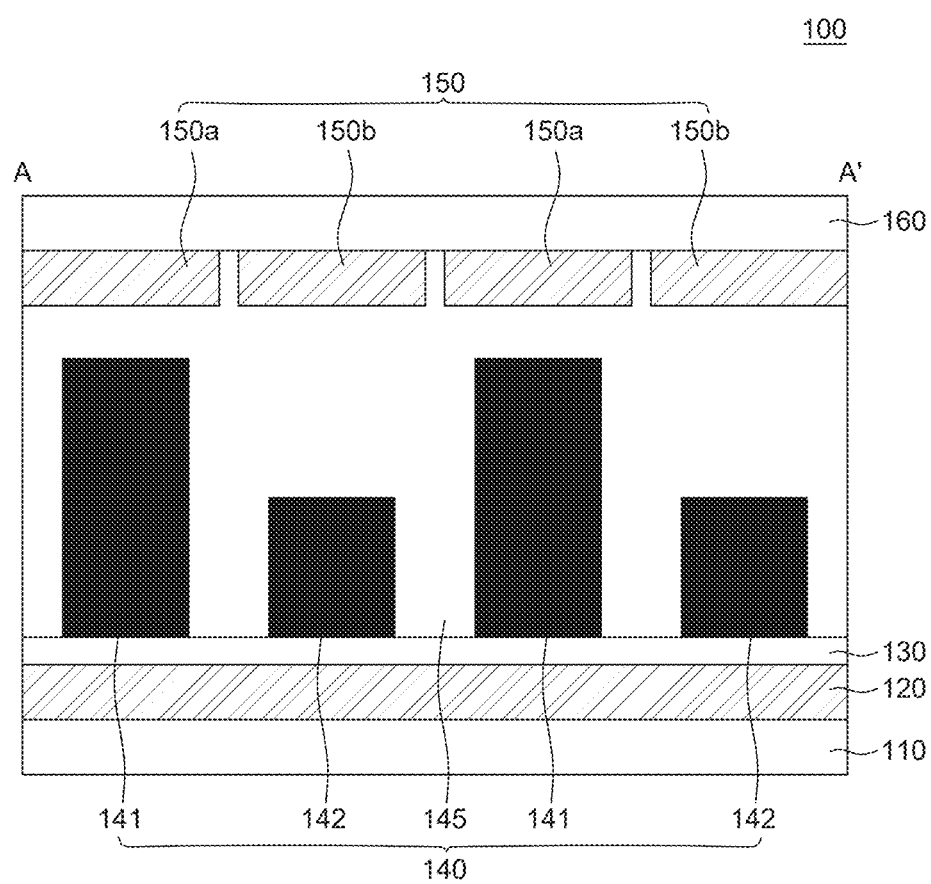
FIG. 3A is a cross-sectional view taken along the line A-A' of FIG. 1 according to an exemplary embodiment of the present disclosure.
Figure 3B:
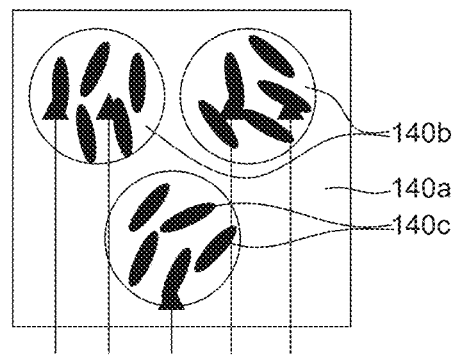
FIGS. 3B and 3C are views for explaining a plurality of first structures and a plurality of second structures of a viewing angle varying film according to an exemplary embodiment of the present disclosure.
Figure 3C:
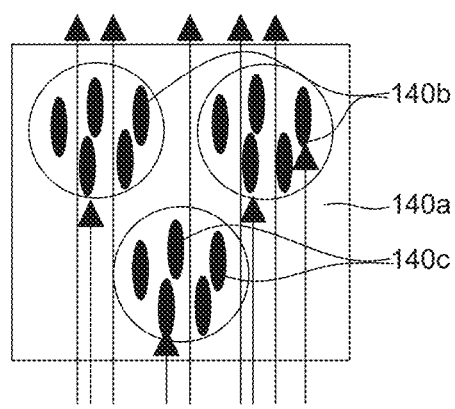

FIG. 1 is a perspective view of a viewing angle varying film according to an exemplary embodiment of the present disclosure. FIG. 2 is a plan view of a second electrode of a viewing angle varying film according to an exemplary embodiment of the present disclosure. FIG. 3A is a cross-sectional view taken along the line A-A' of FIG. 1 according to an exemplary embodiment of the present disclosure. FIGS. 3B and 3C are views for explaining a plurality of first structures and a plurality of second structures of a viewing angle varying film according to an exemplary embodiment of the present disclosure. In FIG. 3A, for the convenience of description, it is illustrated that a plurality of first structures 141 and a plurality of second structures 142 are driven as light blocking units and the plurality of first structures 141 and the plurality of second structures 142 are illustrated with the color black.

First, referring to FIGS. 1 and 3A, the viewing angle varying film 100 may include a first film 110, a first electrode 120 on the first film 110, an adhesive layer 130 on the first electrode 120, a viewing angle varying layer 140 on the adhesive layer 130, a second electrode 150 on the viewing angle varying layer 140, and a second film 160 on the second electrode 150. As shown in FIG. 3A, the second film 160 is spaced apart from the first film 110 and the second electrode 150 is on the second film 160 such that the second electrode 150 is between the second film 160 and the first electrode 120.

The first film 110 is a film which supports components disposed above the viewing angle varying film 100 and may be an insulating film. For example, the first film 110 may be formed of glass, resin, or the like. Further, the first film 110 may include polymer or plastic. In some exemplary embodiments, the first film 110 may be formed of a plastic material having flexibility. For example, the first film 110 may be formed of any one of polyethylene terephthalate (PET), polycarbonate (PC), acrylonitrile-butadiene-styrene (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, a polyimide (PI) film, and polystyrene (PS), but is not limited thereto. Further, the first film 110 may be transparent to allow the light to pass through.

The first electrode 120 may be disposed on the first film 110. The first electrode 120 may apply a voltage to the viewing angle varying layer 140 and specifically, apply a voltage to the plurality of first structures 141 and the plurality of second structures 142. Therefore, the first electrode 120 may be disposed so as to overlap all the plurality of first structures 141 and the plurality of second structures 142. The first electrode 120 may be formed of a transparent conductive material to allow the light to pass through. The first electrode 120 may be formed of indium tin oxide (ITO), but is not limited thereto.

The adhesive layer 130 may be disposed on the first electrode 120. The adhesive layer 130 may use an optically clear adhesive (OCA) to allow the light to pass through, but is not limited thereto.

The viewing angle varying layer 140 may be disposed on the adhesive layer 130. The viewing angle varying layer 140 may be a switchable layer which selectively adjusts a viewing angle by applying an electric signal. The viewing angle varying layer 140 may include a plurality of first structures 141, a plurality of second structures 142, and a transparent layer 145 on the plurality of first structures 141 and the plurality of second structures 142.

The plurality of first structures 141, the plurality of second structures 142, and the transparent layer 145 may be alternately disposed along one direction. That is, as illustrated in FIG. 3A, the plurality of first structures 141 and the plurality of second structures 142 may be alternately disposed from one side.

The plurality of first structures 141 and the plurality of second structures 142 may be alternately disposed to be spaced apart from each other with a predetermined interval. At this time, the plurality of first structures 141 and the plurality of second structures 142 may be disposed so as to extend in the same direction on the plane.

The plurality of first structures 141 and the plurality of second structures 142 include a polymer 140a, a plurality of droplets 140b dispersed in the polymer, and a plurality of colored particles 140c dispersed in the plurality of droplets 140b as shown in FIGS. 3B and 3C. The plurality of first structures 141 and the plurality of second structures 142 may be configured by polymer dispersion liquid crystal (PDLC), but are not limited thereto.

The polymer may be formed of solid so that the plurality of liquid droplets does not fall down and is evenly dispersed in each of the plurality of first structures 141 and the plurality of second structures 142. That is, the remaining parts of the plurality of first structures 141 and the plurality of second structures 142 other than the liquid droplets may be in a solid state.

The plurality of droplets are spherical droplets and may be dispersed in the polymer in the plurality of first structures 141 and the plurality of second structures 142, respectively. Therefore, the plurality of droplets may be disposed to be spaced apart from each other in the polymer.

A plurality of colored particles are dispersed in the plurality of droplets. In the meantime, an alignment direction of the colored particles may change depending on whether a voltage is applied to the viewing angle varying layer 140 so that the plurality of first structures 141 or the plurality of second structures 142 are switched to light transmitting units or light blocking units depending on whether the voltage is applied.

Referring to FIG. 3B, first, when the voltage is not applied to the colored particles 140c, the colored particles 140c may be randomly aligned in the droplet 140b along a first alignment direction (e.g., a first direction). At this time, the colored particles 140c which are randomly aligned and the polymer 140a have different refractive indexes so that light may be scattered from an interface between the colored particles 140c and the polymer 140a. That is, light may not pass through the plurality of first structures 141 or the plurality of second structures 142. At this time, the plurality of first structures 141 or the plurality of second structures 142 may serve as light blocking units.

In contrast, referring to FIG. 3C, when the voltage is applied to the colored particles 140c, the colored particles 140c are aligned in the liquid droplets 140b along a second alignment direction (e.g., a second direction) which is predetermined and different from the first alignment direction and a refractive index of the colored particles 140c with respect to a direction in which the light passes through is changed. Therefore, the refractive indexes of the colored particles 140c and the polymer 140a become the same or there is substantially no difference in the refractive indexes. Therefore, light which is incident onto the plurality of first structures 141 and the plurality of second structures 142 may pass through the plurality of first structures 141 or the plurality of second structures 142. That is, at this time, the plurality of first structures 141 or the plurality of second structures 142 may serve as light transmitting units.

At this time, in order to not only switch the viewing angle varying layer 140 to the light transmitting unit or the light blocking unit, but also vary the viewing angle, the plurality of first structures 141 and the plurality of second structures 142 may be configured to be different. Specifically, at least one or more of a height, a width, and a shape of the plurality of first structures 141 and the plurality of second structures 142 may be different. Referring to FIG. 3A, for example, cross-sectional shapes of the plurality of first structures 141 and the plurality of second structures 142 may be rectangles with the same width, but different heights. Therefore, the structure in which at least one or more of the height, the width, and the shape are different according to a requested viewing angle characteristic is driven as a light transmitting unit or a light blocking unit, so that various viewing angle modes may be implemented. This will be described in detail with reference to FIG. 3C to be described below.

The transparent layer 145 may be formed of a transparent light transmissive material. The transparent layer 145 may transmit light which is incident onto the first film 110 or the second film 160 to different film directions. The transparent layer 145, for example, may be formed of UV resin, transparent photoresist resin, urethane resin, or acrylic resin, but is not limited thereto.

Referring to FIGS. 2 and 3A together, the second electrode 150 may be disposed on the viewing angle varying layer 140. The second electrode 150 may include a first sub electrode 150a and a second sub electrode 150b.

Specifically, the first sub electrode 150*a* is disposed to overlap the plurality of first structures 141 without overlapping the second structures 142 to apply a voltage to the colored particles of the plurality of first structures 141. That is, the plurality of first structures 141 may be driven as the light transmitting units or the light blocking units depending on whether a voltage is applied to the first sub electrode 150*a*. The second sub electrode 150*b* is disposed to overlap the plurality of second structures 142 without overlapping the first structures 141 to apply a voltage to the colored particles of the plurality of second structures 142. That is, the plurality of second structures 142 may be driven as the light transmitting unit or the light blocking unit depending on whether to a voltage is applied to the second sub electrode 150*b*. Therefore, the first sub electrode 150*a* and the second sub electrode 150*b* of the second electrode 150 may be alternately disposed on the plane.

The second electrode 150 may be formed of a transparent conductive material to allow the light to pass through, like the first electrode 120. The second electrode 150 may be formed of indium tin oxide (ITO), but is not limited thereto.

Referring to FIG. 3A, a second film 160 may be disposed on the second electrode 150. The second film 160 is a film which supports components disposed below the second film 160 and may be an insulating film. For example, the second film 160 may be formed of glass, resin, or the like. Further, the second film 160 may include polymer or plastic. In some exemplary embodiments, the second film 160 may be formed of a plastic material having flexibility. For example, the second film 120 may be formed of any one of polyethylene terephthalate (PET), polycarbonate (PC), acrylonitrile-butadiene-styrene (ABS), polymethyl methacrylate (PMMA), polyethylene naphthalate (PEN), polyether sulfone (PES), cyclic olefin copolymer (COC), a triacetyl-cellulose (TAC) film, a polyvinyl alcohol (PVA) film, a polyimide (PI) film, and polystyrene (PS), but is not limited thereto. Further, the second film 160 may be transparent to allow the light to pass through.

Figure 3D:
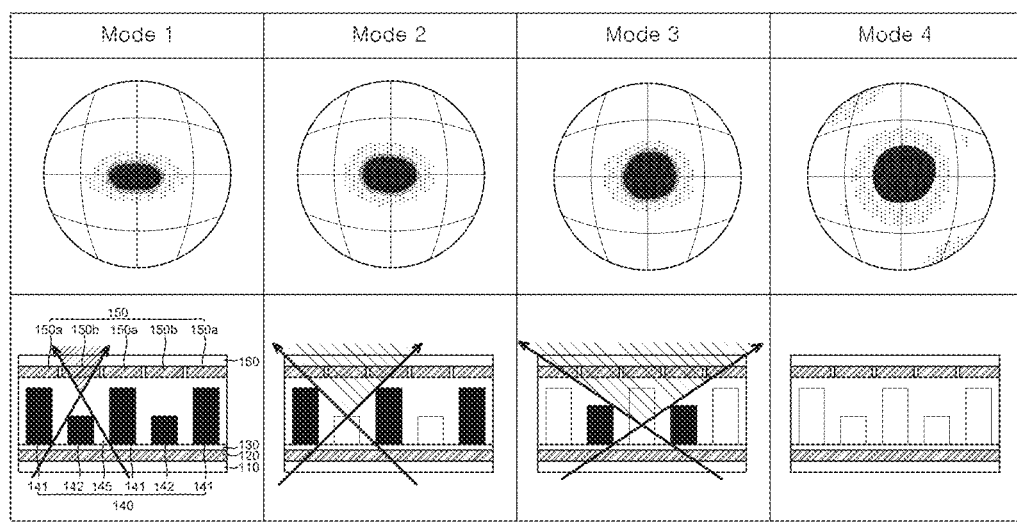
FIG. 3D is a view for explaining a viewing angle mode of a viewing angle varying film according to an exemplary embodiment of the present disclosure.

FIG. 3D is a view for explaining a viewing angle mode of a viewing angle varying film according to an exemplary embodiment of the present disclosure. In FIG. 3D, when all the plurality of first structures 141 and the plurality of second structures 142 of the viewing angle varying film 100 according to the exemplary embodiment of the present disclosure described above serve as light blocking units, it is illustrated as a first mode Mode1. When the plurality of first structures 141 serves as light blocking units and the plurality of second structures 142 serves as light transmitting units, it is illustrated as a second mode Mode2. When the plurality of first structures 141 serves as light transmitting units and the plurality of second structures 142 serves as light blocking units, it is illustrated as a third mode Mode3. When all the plurality of first structures 141 and the plurality of second structures 142 serve as light transmitting units, it is illustrated as a fourth mode Mode4. For the convenience of description, when the plurality of first structures or the plurality of second structures are driven as the light blocking unit, it is illustrated with black and when the plurality of first structures or the plurality of second structures is driven as the light transmitting units, it is illustrated with white. In FIG. 3D, an upper image is a view which illustrates a light transmitting degree according to a viewing angle and the darker the hatching, the higher the transmittance and the weaker the hatching, the lower the transmittance. Further, for the convenience of description, even though only the viewing angle varying film 100 illustrated in a lower side of the first mode Mode1 of FIG. 3D is denoted by the reference numeral, viewing angle varying films illustrated in lower sides of the second mode Mode2, the third mode Mode3, and the fourth mode Mode4 include the same configurations as the viewing angle varying film illustrated in the lower side of the first mode Mode1. That is, the configurations of the viewing angle varying films illustrated at the lower sides of the second mode Mode2, the third mode Mode3, and the fourth mode Mode4 correspond to the configurations of the viewing angle varying film illustrated at the lower side of the first mode Mode1, respectively.

In the first mode Mode1, the voltage is not applied to both the first sub electrode 150*a* and the second sub electrode 150*b* so that all the plurality of first structures 141 and the plurality of second structures 142 may serve as the light blocking units. That is, the light passes through the transparent layer 145 but not the first and second structures 141, 142 so that the narrowest viewing angle may be implemented in the first mode Mode1.

In the second mode Mode2, the voltage is not applied to the first sub electrode 150*a* so that the plurality of first structures 141 may serve as the light blocking units. In contrast, the voltage is applied to the plurality of second structures 142 through the second sub electrode 150*b* so that the plurality of second structures 142 may serve as the light transmitting unit. That is, the light passes through the plurality of second structures 142 and the transparent layer 145 so that in the second mode Mode2, a wider viewing angle than that of the first mode Mode1 may be implemented.

In the third mode Mode3, the voltage is not applied to the second sub electrode 150*b* so that the plurality of second structures 142 may serve as the light blocking units. In contrast, the voltage is applied to the plurality of first structures 141 through the first sub electrode 150*a* but not the second structures 142 so that the plurality of first structures 141 may serve as the light transmitting unit. That is, the light transmits through the plurality of first structures 141 and the transparent layer 145. At this time, unlike the second mode Mode2 in which the plurality of first structures 141 serves as the light blocking unit, in the third mode Mode3, the plurality of second structures 142 which is lower than the plurality of first structures 141 serves as the light blocking unit so that an area in which the light is blocked may be small. Therefore, in the third mode Mode3, a wider viewing angle than that of the second mode Mode2 may be implemented.

In the fourth mode Mode4, the voltage is not applied to both the first sub electrode 150*a* and the second sub electrode 150*b* so that all the plurality of first structures 141 and the plurality of second structures 142 may serve as the light transmitting units. That is, the light transmits through the entire viewing angle varying layer 140 so that in the fourth mode Mode4, the widest viewing angle may be implemented.

For the personal privacy, a demand for a viewing angle varying film which is attached to various displays such as a cellular phone, a tablet PC, a monitor, or a display for a vehicle to block light transmission in a specific direction and narrows a viewing angle and a display device including the same is increasing.

In the meantime, the viewing angle varying film may be used in various environments depending on the user. For example, the viewing angle varying film may be used during the day or night and may be applied to various environments when a user requires a specific viewing angle or requires an improved visibility depending on the purpose of use. At this time, in order to satisfy various viewing angle characteristics according to the requirements of the user, there is a difficulty that it is necessary to manufacture various molds suitable therefor.

Therefore, in the viewing angle varying film 100 according to the exemplary embodiment of the present disclosure, the viewing angle varying layer 140 includes a plurality of first structures 141 and a plurality of second structures 142 which have different heights. At this time, the plurality of first structures 141 may be separately driven by the first sub electrode 150a and the plurality of second structures 142 may be separately driven by the second sub electrode 150b. Accordingly, in the viewing angle varying film according to the exemplary embodiment of the present disclosure, the plurality of first structures 141 or the plurality of second structures 142 may be selectively utilized as the light transmitting unit or the light blocking unit. Therefore, various viewing angle characteristics according to the requirements of the user may be satisfied.

That is, in the viewing angle varying film 100 according to the exemplary embodiment of the present disclosure, the viewing angle varying layer 140 includes a plurality of first structures 141 and a plurality of second structures 142 which are different from each other. Accordingly, in the viewing angle varying film 100 according to the exemplary embodiment of the present disclosure, the plurality of first structures 141 and the plurality of second structures 142 are designed to have different heights so that viewing angle in various modes may be implemented. Therefore, it is not necessary to manufacture various molds according to the requirements of the user so that a manufacturing cost may be saved.

Figure 4:
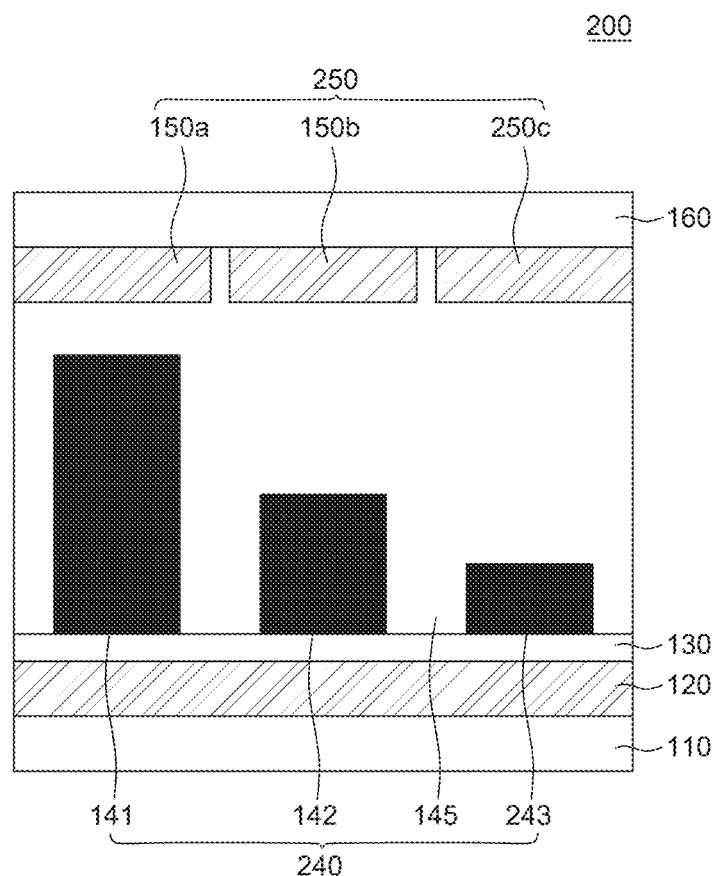
FIG. 4 is a cross-sectional view of a viewing angle varying film according to another exemplary embodiment of the present disclosure.

FIG. 4 is a cross-sectional view of a viewing angle varying film according to another exemplary embodiment of the present disclosure. The viewing angle varying film 200 of FIG. 4 is different from the viewing angle varying film 100 of FIGS. 1 to 3C only in the presence of the plurality of third structures 243, among the configurations of the viewing angle varying layer 240 and the presence of the third sub electrode 250c, among the configurations of the second electrode 250. However, other components are substantially the same so that a redundant description will be omitted. In FIG. 4, for the convenience of description, it is illustrated that a plurality of first structures 141, a plurality of second structures 142, and a plurality of third structures 243 are driven as light blocking units and they are illustrated with black.

Referring to FIG. 4, the viewing angle varying layer 240 may include a plurality of first structures 141, a plurality of second structures 142, a plurality of third structures 243, and a transparent layer 145.

The plurality of first structures 141, the plurality of second structures 142, the plurality of third structures 243, and the transparent layer 145 may be alternately disposed along one direction. That is, the plurality of first structures 141, the plurality of second structures 142, and the plurality of third structures 243 may be alternately disposed from one side.

The plurality of first structures 141, the plurality of second structures 142, and the plurality of third structures 243 may be alternately disposed to be spaced apart from each other with a predetermined interval. At this time, the plurality of first structures 141, the plurality of second structures 142, and the plurality of third structures 243 may be disposed so as to extend in the same direction on the plane.

Similar to the plurality of first structures 141 and the plurality of second structures 142, the plurality of third structures 243 includes a polymer, a plurality of droplets dispersed in the polymer, and a plurality of colored particles dispersed in the plurality of droplets. That is, the plurality of first structures 141, the plurality of second structures 142, and the plurality of third structures 243 may be configured by polymer dispersion liquid crystal (PDLC), but are not limited thereto. That is, similar to the plurality of first structures 141 and the plurality of second structures 142, the plurality of third structures 243 may also be switched to the light transmitting unit or the light blocking unit depending on whether to apply a voltage.

At this time, in order to not only switch the viewing angle varying layer 240 to the light transmitting unit or the light blocking unit, but also vary the viewing angle, the plurality of first structures 141, the plurality of second structures 142, and the plurality of third structures 243 may be configured to be different. Specifically, cross-sectional shapes of the plurality of first structures 141, the plurality of second structures 142, and the plurality of third structures 243 may be rectangles with the same width, but different heights. That is, the plurality of first structures 141, the plurality of second structures 142, or the plurality of third structures 243 with different heights is driven as the light transmitting unit or the light blocking unit depending on the requested viewing angle characteristic, so that various viewing angle modes may be implemented. For example, the plurality of first structures 141 having the largest height may be driven as the light blocking unit without the second and third structures 142, 143 being driven. At this time, a narrower viewing angle may be implemented as compared with a case that the plurality of second structures 142 or the plurality of third structures 243 are driven as the light blocking unit. In the meantime, the plurality of third structures 243 having the smallest height may be driven as the light blocking unit without the first and second structures 141, 142 being driven. At this time, a wider viewing angle may be implemented as compared with a case that the plurality of first structures 141 or the plurality of second structures 142 is driven as the light blocking unit.

A second electrode 250 may be disposed on the viewing angle varying layer 240. The second electrode 250 may include a first sub electrode 150a, a second sub electrode 150b, and a third sub electrode 250c.

Specifically, the first sub electrode 150a is disposed to overlap the plurality of first structures 141 without overlapping the second and third structures 142, 143 to apply a voltage to the colored particles of the plurality of first structures 141. That is, the plurality of first structures 141 may be driven as the light transmitting unit or the light blocking unit depending on whether the voltage is applied to the first sub electrode 150a. The second sub electrode 150b is disposed to overlap the plurality of second structures 142 without overlapping the first and third structures 141, 143 to apply a voltage to the colored particles of the plurality of second structures 142. That is, the plurality of second structures 142 may be driven as the light transmitting unit or the light blocking unit depending on whether the voltage is applied to the second sub electrode 150b. The third sub electrode 250c is disposed to overlap the plurality of third structures 243 without overlapping the first and second structures 141, 142 to apply a voltage to the colored particles of the plurality of third structures 243. That is, the plurality of third structures 243 may be driven as the light transmitting unit or the light blocking unit depending on whether the voltage is applied to the third sub electrode 250c. Therefore, the first sub electrode 150a, the second sub electrode 150b, and the third sub electrode 250c of the second electrode 250 may be alternately disposed on the plane.

In the viewing angle varying film 200 according to another exemplary embodiment of the present disclosure, the viewing angle varying layer 240 further includes not only the plurality of first structures 141 and the plurality of second structures 142 which have different heights, but also a plurality of third structures 243. At this time, the plurality of first structures 141 may be separately driven by the first sub electrode 150*a*, the plurality of second structures 142 may be separately driven by the second sub electrode 150*b*, and the plurality of third structures 243 may be separately driven by the third sub electrode 250*c*. Accordingly, in the viewing angle varying film 200 according to another exemplary embodiment of the present disclosure, not only the plurality of first structures 141 or the plurality of second structures 142, but also the plurality of third structures 243 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Figure 5A:
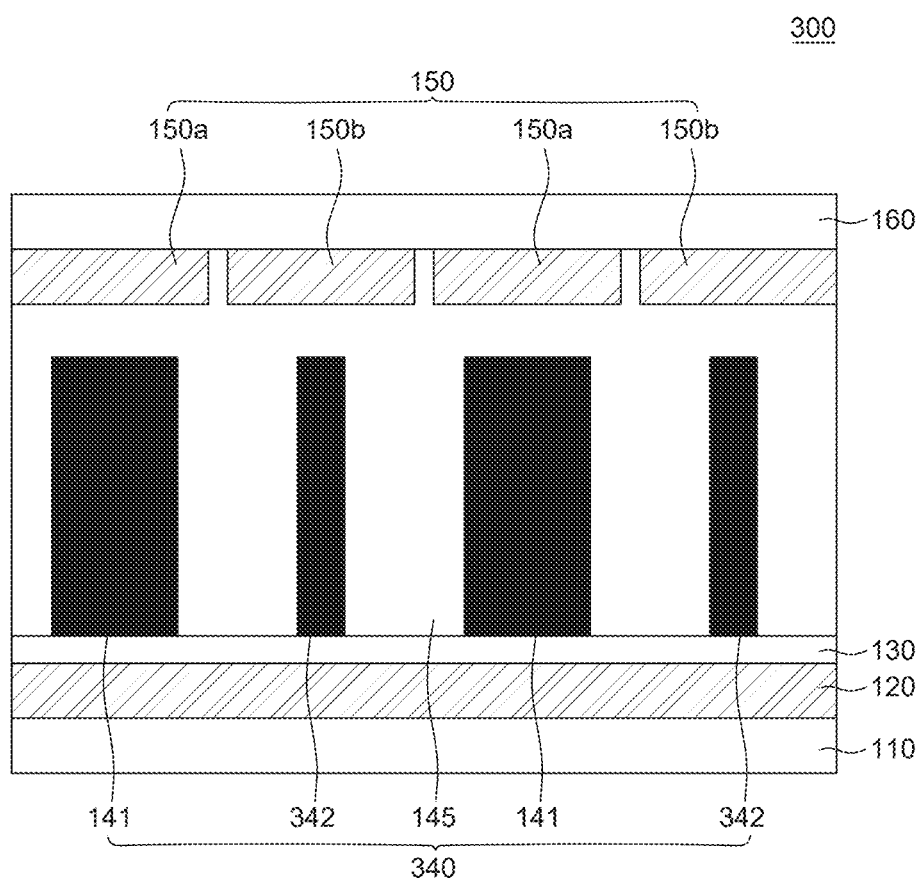
FIGS. 5A and 5B are cross-sectional views of a viewing angle varying film according to still another exemplary embodiment of the present disclosure.
Figure 5B:
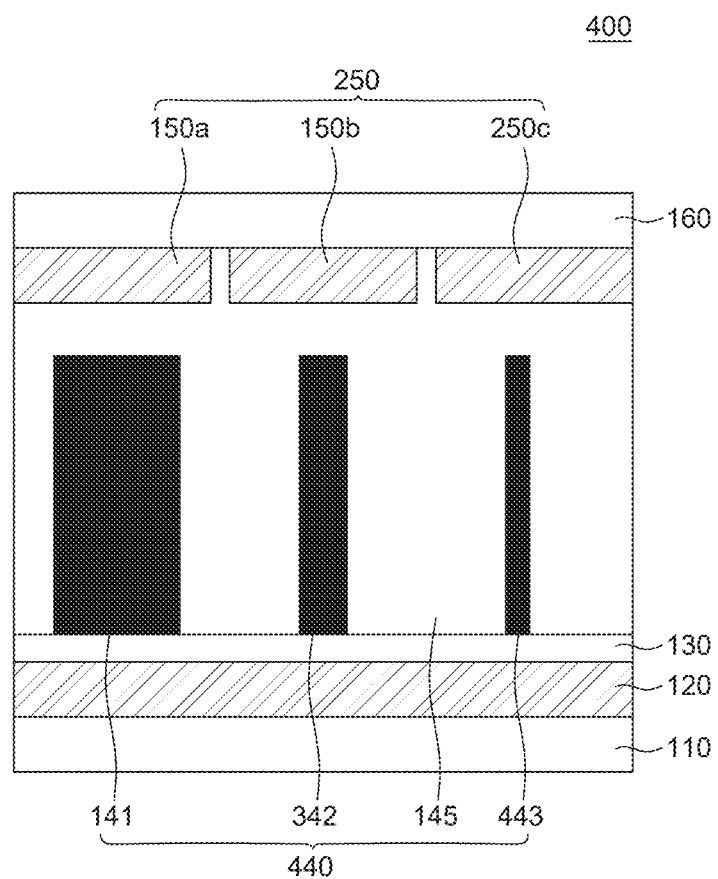

FIGS. 5A and 5B are cross-sectional views of a viewing angle varying film according to still another exemplary embodiment of the present disclosure. The only difference of a viewing angle varying film 300 of FIG. 5A from the viewing angle varying film 100 of FIGS. 1 to 3D is a height and a width of the plurality of second structures 342, among the configurations of a viewing angle varying layer 340. However, other components are substantially the same so that a redundant description will be omitted. In FIG. 5A, for the convenience of description, it is illustrated that a plurality of first structures 141 and a plurality of second structures 342 are driven as light blocking units and the plurality of first structures 141 and the plurality of second structures 342 are illustrated with black. The viewing angle varying film 400 of FIG. 5B is different from the viewing angle varying film 300 of FIG. 5A only in the presence of a plurality of third structures 443, among the configurations of the viewing angle varying layer 440 and the presence of a third sub electrode 250*c*, among the configurations of the second electrode 250. However, other components are substantially the same so that a redundant description will be omitted. In FIG. 5B, for the convenience of description, it is illustrated that a plurality of first structures 141, a plurality of second structures 342, and a plurality of third structures 443 are driven as light blocking units and they are illustrated with black.

Referring to FIG. 5A, for example, cross-sectional shapes of the plurality of first structures 141 and the plurality of second structures 342 may be rectangles with the same height, but different widths. For example, a width of a cross-section of the plurality of first structures 141 may be larger than a width of the plurality of second structures 342. That is, when a voltage is applied only to the second sub electrode 150*b* of the second electrode 150 so that the plurality of first structures 141 serves as a light blocking unit, a narrower viewing angle may be implemented than that in a case that a voltage is applied to the first sub electrode 150*a* so that the plurality of second structures 342 serves as a light blocking unit.

That is, in the viewing angle varying film 300 according to still another exemplary embodiment of the present disclosure, the viewing angle varying layer 340 includes a plurality of first structures 141 and a plurality of second structures 342 which have different widths. At this time, the plurality of first structures 141 may be separately driven by the first sub electrode 150*a* and the plurality of second structures 342 may be separately driven by the second sub electrode 150*b*. Accordingly, in the viewing angle varying film 300 according to still another exemplary embodiment of the present disclosure, the plurality of first structures 141 or the plurality of second structures 342 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Referring to FIG. 5B, the viewing angle varying layer 440 may include a plurality of first structures 141, a plurality of second structures 342, a plurality of third structures 443, and a transparent layer 145.

The plurality of first structures 141, the plurality of second structures 342, the plurality of third structures 443, and the transparent layer 145 may be alternately disposed along one direction. That is, the plurality of first structures 141, the plurality of second structures 342, and the plurality of third structures 443 may be alternately disposed from one side.

The plurality of first structures 141, the plurality of second structures 342, and the plurality of third structures 443 may be alternately disposed to be spaced apart from each other with a predetermined interval. At this time, the plurality of first structures 141, the plurality of second structures 342, the plurality of third structures 443, and the transparent layer 145 may be disposed so as to extend in the same direction on the plane.

Similar to the plurality of first structures 141 and the plurality of second structures 342, the plurality of third structures 443 includes a polymer, a plurality of droplets dispersed in the polymer, and a plurality of colored particles dispersed in the plurality of droplets. That is, the plurality of first structures 141, the plurality of second structures 342, and the plurality of third structures 443 may be configured by polymer dispersion liquid crystal (PDLC), but are not limited thereto. That is, similar to the plurality of first structures 141 and the plurality of second structures 342, the plurality of third structures 443 may also be switched to the light transmitting unit or the light blocking unit depending on whether to apply a voltage.

At this time, in order to not only switch the viewing angle varying layer 440 to the light transmitting unit or the light blocking unit, but also vary the viewing angle, the plurality of first structures 141, the plurality of second structures 342, and the plurality of third structures 443 may be configured to be different. Specifically, cross-sectional shapes of the plurality of first structures 141, the plurality of second structures 342, and the plurality of third structures 443 may be rectangles with the same height, but different widths. That is, the plurality of first structures 141, the plurality of second structures 342, or the plurality of third structures 443 with different heights is driven as the light transmitting unit or the light blocking unit depending on the requested viewing angle characteristic, so that various viewing angle modes may be implemented. For example, the plurality of first structures 141 having the largest width may be driven as the light blocking unit without the second and third structures 342, 443 being driven. At this time, a narrower viewing angle may be implemented as compared with a case that only the plurality of second structures 342 or the plurality of third structures 443 is driven as the light blocking unit. In the meantime, the plurality of third structures 443 having the smallest width may be driven as the light blocking unit without the first and second structures 142, 342 being driven. At this time, a wider viewing angle may be implemented as compared with a case that the plurality of first structures 141 or the plurality of second structures 342 is driven as the light blocking unit.

A second electrode 250 may be disposed on the viewing angle varying layer 440. The second electrode 250 may include a first sub electrode 150*a*, a second sub electrode 150*b*, and a third sub electrode 250*c*.

Specifically, the first sub electrode 150*a* is disposed to overlap the plurality of first structures 141 without overlapping the second and third structures 342, 443 to apply a voltage to the colored particles of the plurality of first structures 141. That is, the plurality of first structures 141 may be driven as the light transmitting unit or the light blocking unit depending on whether the voltage is applied to the first sub electrode 150*a*. The second sub electrode 150*b* is disposed to overlap the plurality of second structures 342 without overlapping the first and third structures 141, 443 to apply a voltage to the colored particles of the plurality of second structures 342. That is, the plurality of second structures 342 may be driven as the light transmitting unit or the light blocking unit depending on whether the voltage is applied to the second sub electrode 150*b*. The third sub electrode 250*c* is disposed to overlap the plurality of third structures 443 without overlapping the first and second structures 141, 342 to apply a voltage to the colored particles of the plurality of third structures 443. That is, the plurality of third structures 443 may be driven as the light transmitting unit or the light blocking unit depending on whether the voltage is applied to the third sub electrode 250*c*. Therefore, the first sub electrode 150*a*, the second sub electrode 150*b*, and the third sub electrode 250*c* of the second electrode 250 may be alternately disposed on the plane.

In the viewing angle varying film 400 according to another exemplary embodiment of the present disclosure, the viewing angle varying layer 440 further includes not only the plurality of first structures 141 and the plurality of second structures 342 which have different widths, but also a plurality of third structures 443. At this time, the plurality of first structures 141 may be separately driven by the first sub electrode 150*a*, the plurality of second structures 342 may be separately driven by the second sub electrode 150*b*, and the plurality of third structures 443 may be separately driven by the third sub electrode 250*c*. Accordingly, in the viewing angle varying film 400 according to another exemplary embodiment of the present disclosure, not only the plurality of first structures 141 or the plurality of second structures 342, but also the plurality of third structures 443 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Figure 6A:
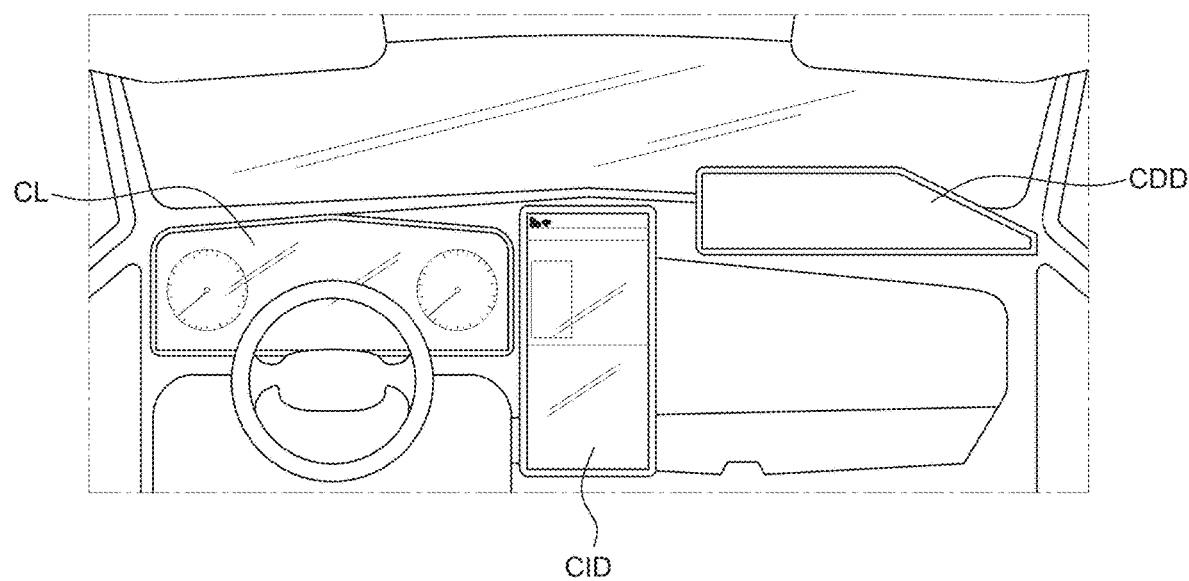
FIGS. 6A and 6B are views for explaining an example that a viewing angle varying film according to an exemplary embodiment of the present disclosure is utilized.
Figure 6B:
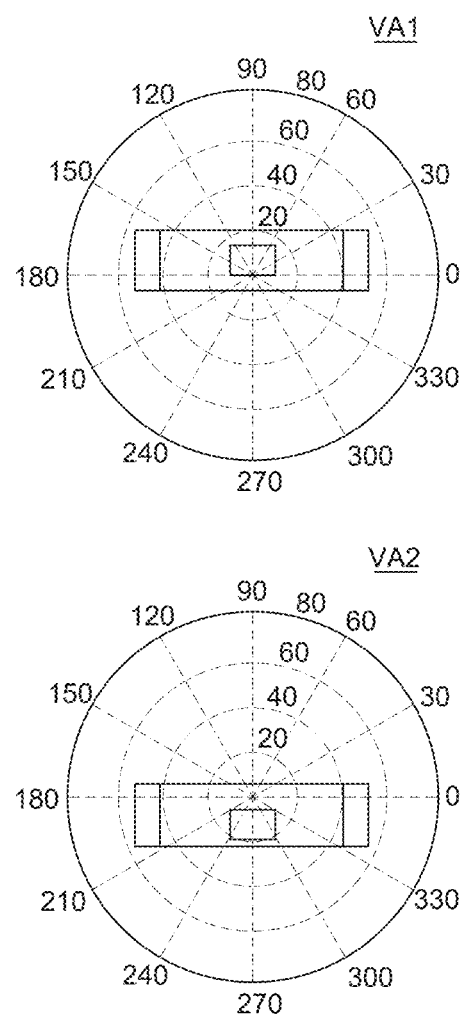

FIGS. 6A and 6B are views for explaining an example that a viewing angle varying film according to an exemplary embodiment of the present disclosure is utilized.

Referring to FIG. 6A, the viewing angle varying film 100 according to the exemplary embodiment of the present disclosure may be applied to a dashboard CL, a central information display CID, and a co-driver display CDD in the vehicle. In the meantime, even though it is not illustrated in the drawing, the viewing angle varying film 100 may be applied to the inside of the vehicle which supplies information to a driver, such as a side mirror or a head-up display.

Referring to FIG. 6B together, in the viewing angle varying film 100 which is applied to the dashboard CL and the center information display CID, a first viewing angle VA1 may be implemented in accordance with an eye level of the user. That is, when a center of an outermost circle of FIG. 6B is 0°, a viewing angle which is narrowed to a range of −20° to 10° may be implemented.

In the meantime, as illustrated in FIG. 6A, the co-driver display CDD is generally disposed on the dashboard so that in the viewing angle varying film 100 applied to the co-driver display CDD, a second viewing angle VA2 may be implemented. That is, when a center of an outermost circle of FIG. 6A is 0°, a viewing angle which is narrowed to a range of −10° to 20° may be implemented. In the meantime, even though in FIG. 6A, it is illustrated that the center information display CID is disposed below the dashboard, the center information display CID may be disposed on the dash board. In this case, the second viewing angle VA2 may be implemented in accordance with the eye level of the user.

Figure 7A:
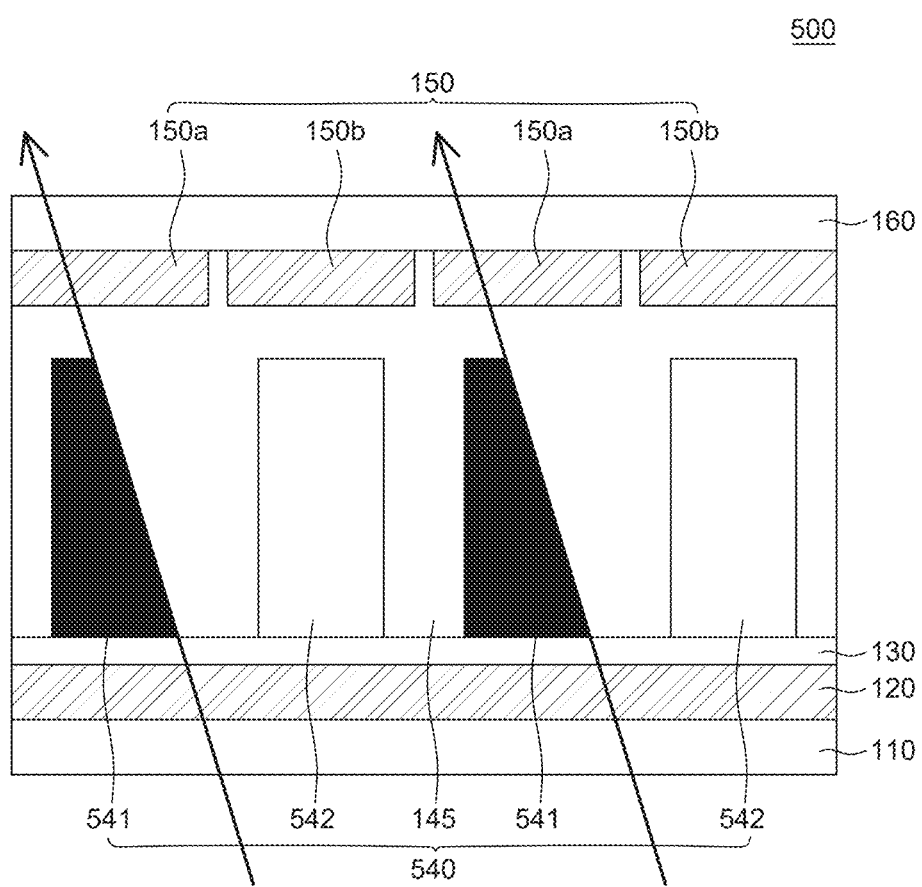
FIGS. 7A and 7B are cross-sectional views of a viewing angle varying film according to still another exemplary embodiment of the present disclosure.
Figure 7B:
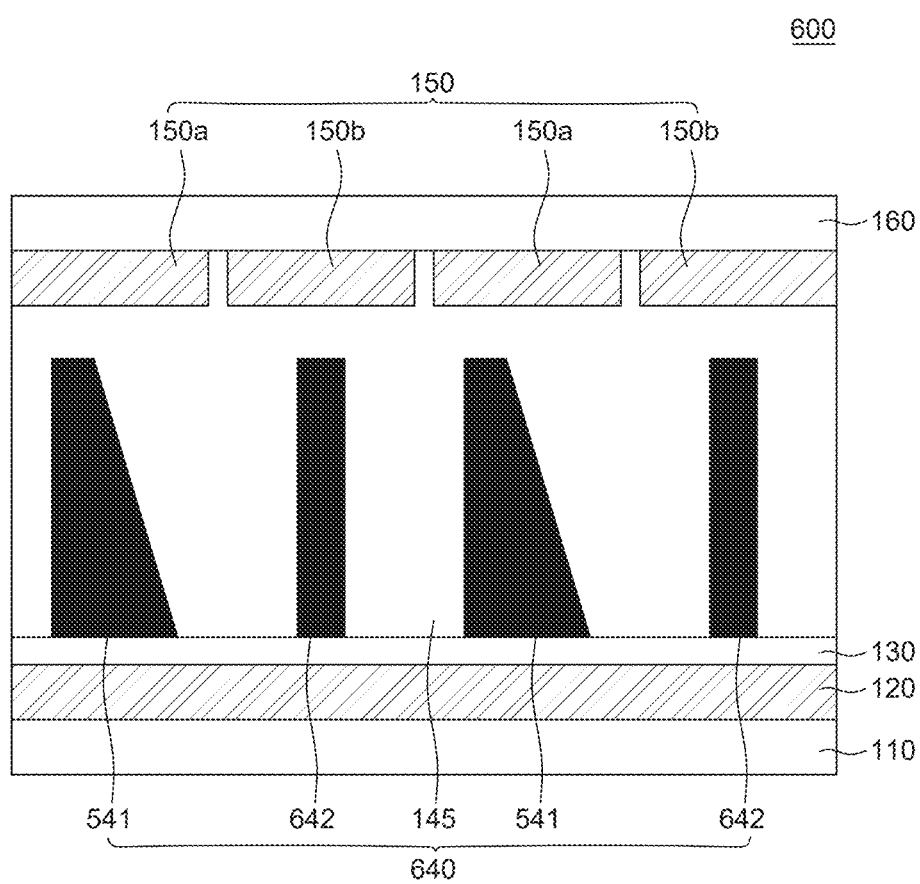

FIGS. 7A and 7B are cross-sectional views of a viewing angle varying film according to still another exemplary embodiment of the present disclosure. The only difference of a viewing angle varying film 500 of FIG. 7A from the viewing angle varying film 100 of FIGS. 1 to 3D is a width, a height, and a shape of a plurality of first structures 541 and a plurality of second structures 540, among the configurations of a viewing angle varying film 540. However, other components are substantially the same so that a redundant description will be omitted. The only difference of a viewing angle varying film 600 of FIG. 7B from the viewing angle varying film 500 of FIG. 7A is a width of the plurality of second structures 642, among the configurations of a viewing angle varying layer 640. However, other components are substantially the same so that a redundant description will be omitted. In FIG. 7A, it is illustrated that the plurality of first structures 541 is driven as a light blocking unit and the plurality of second structures 542 are driven as a light transmitting unit and the plurality of first structures 541 is illustrated with black and the plurality of second structures 542 is illustrated with white. In FIG. 7B, for the convenience of description, it is illustrated that a plurality of first structures 541 and a plurality of second structures 642 are driven as light blocking units and the plurality of first structures 541 and the plurality of second structures 642 are illustrated with black.

Referring to FIG. 7A, for example, cross-sectional shapes of the plurality of first structures 541 and the plurality of second structures 542 may be a trapezoid and a rectangle, respectively. In FIG. 7A, it is illustrated that the cross-sectional shape of the plurality of first structures 541 is a trapezoid and the cross-sectional shape of the plurality of second structures 542 is a rectangle. In contrast, the cross-sectional shape of the plurality of first structures 541 may be a rectangle and the cross-sectional shape of the plurality of second structures 542 may be a trapezoid. At this time, heights of the plurality of first structures 541 and the plurality of second structures 542 may be the same.

Specifically, one of side surfaces of the plurality of first structures 541 may be vertical to the bottom surface and the other side may be inclined with respect to the bottom surface. For example, referring to FIG. 7A, a left surface of the plurality of first structures 541 may be vertical to the bottom surface and a right surface may be inclined with respect to the bottom surface. Further, a width of a top surface of the plurality of first structures 541 may be smaller than a width of a bottom surface of the plurality of first structures 541. That is, when the plurality of first structures 541 are driven as a light blocking unit without the second structures 542 being driven, a moving direction of light which passes through the viewing angle varying film 500 may be adjusted to the left side as illustrated in FIG. 7A.

However, when the plurality of second structures 542 are driven as a light blocking unit without the first structures 541 being driven, a moving direction of light which passes through the viewing angle varying film 500 may be adjusted to the center direction. That is, the plurality of first structures 541 and the plurality of second structures 542 having different shapes are disposed to adjust the viewing angle to a specific direction.

In the meantime, widths of the top surface and the bottom surface of the plurality of second structures 542 may be equal to a width of the bottom surface of the plurality of first structures 541, but are not limited thereto.

That is, in the viewing angle varying film 500 according to still another exemplary embodiment of the present disclosure, the viewing angle varying layer 540 includes a plurality of first structures 541 and a plurality of second structures 542 which have different shapes. At this time, the plurality of first structures 541 may be separately driven by the first sub electrode 150a and the plurality of second structures 542 may be separately driven by the second sub electrode 150b. Accordingly, in the viewing angle varying film 500 according to still another exemplary embodiment of the present disclosure, the plurality of first structures 541 or the plurality of second structures 542 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 500 according to another exemplary embodiment of the present disclosure, the viewing angle varying layer 540 includes a plurality of first structures 541 having a trapezoidal cross-section. That is, a left surface and a right surface of the plurality of first structures 541 may be asymmetrical. Therefore, light which passes through the viewing angle varying layer 540 may be tilted to a specific direction. Accordingly, in the viewing angle varying film 500 according to another exemplary embodiment of the present disclosure, a viewing angle may be adjusted in a specific direction.

Referring to FIG. 7B, a cross-section of the plurality of second structures 642 is a rectangle so that widths of a top surface and a bottom surface of the plurality of second structures 642 may be equal to a width of a bottom surface of the plurality of first structures 541, but is not limited thereto. That is, the area of the plurality of second structures 642 of the viewing angle varying film 600 of FIG. 7B may be smaller than that of the viewing angle varying film 500 of FIG. 7A. Therefore, when the plurality of second structures 642 of the viewing angle varying film 600 of FIG. 7B is driven as a light blocking unit, a wider viewing angle may be implemented.

That is, in the viewing angle varying film 600 according to still another exemplary embodiment of the present disclosure, the viewing angle varying layer 640 includes a plurality of first structures 541 and a plurality of second structures 642 which have different shapes and different widths. At this time, the plurality of first structures 541 may be separately driven by the first sub electrode 150a and the plurality of second structures 642 may be separately driven by the second sub electrode 150b. Accordingly, in the viewing angle varying film 600 according to still another exemplary embodiment of the present disclosure, the plurality of first structures 541 or the plurality of second structures 642 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 600 according to another exemplary embodiment of the present disclosure, the viewing angle varying layer 640 includes a plurality of first structures 541 having a trapezoidal cross-section. That is, a left surface and a right surface of the plurality of first structures 541 may be asymmetrical. Therefore, light which passes through the viewing angle varying layer 640 may be tilted to a specific direction. That is, the viewing angle may be adjusted to a specific direction.

Figure 8A:
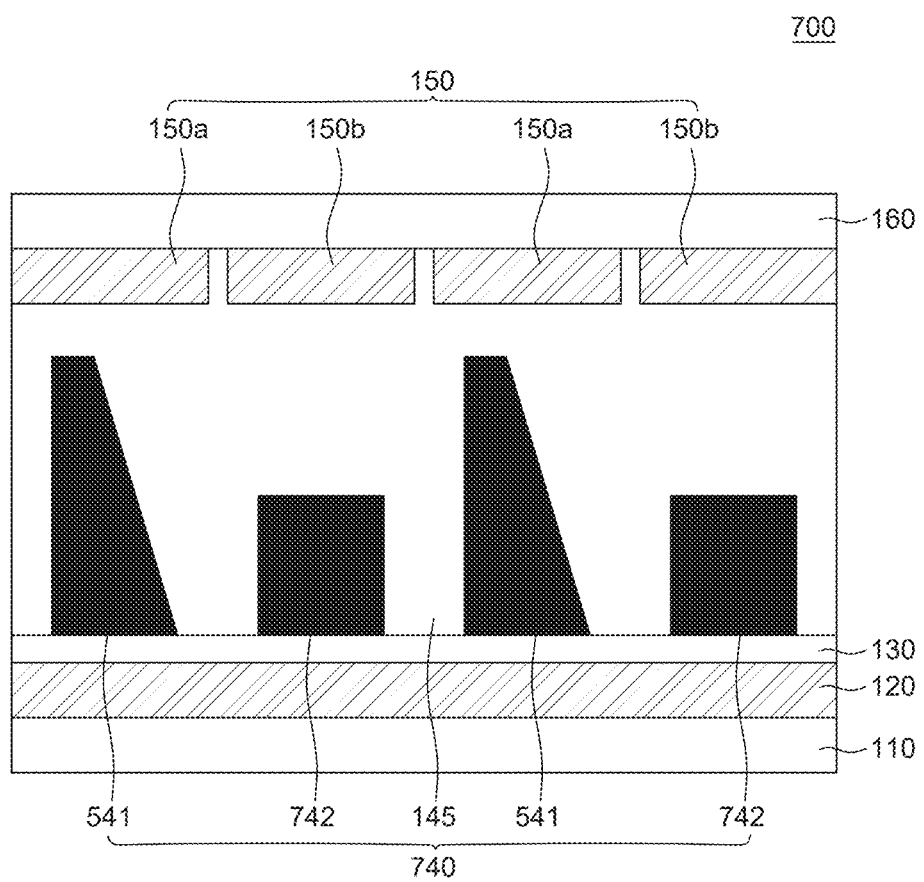
FIGS. 8A and 8B are cross-sectional views of a viewing angle varying film according to still another exemplary embodiment of the present disclosure.
Figure 8B:
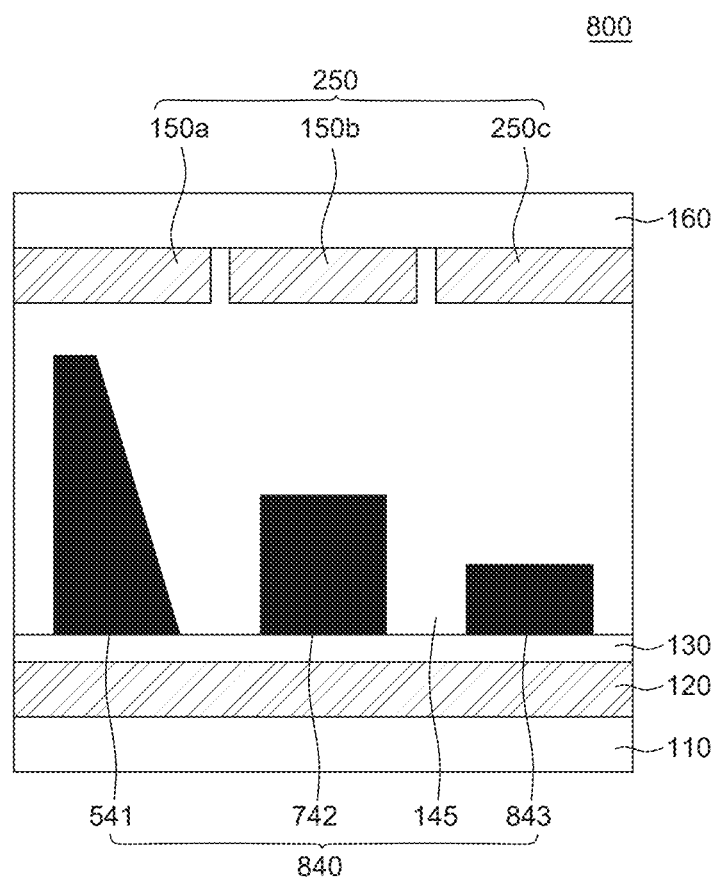

FIGS. 8A and 8B are cross-sectional views of a viewing angle varying film according to still another exemplary embodiment of the present disclosure. In the viewing angle varying film 700 of FIG. 8A, only a height of the plurality of second structures 742 is different from that of the viewing angle varying film 500 of FIG. 7A, but other components are substantially the same, so that a redundant description will be omitted. In FIG. 8A, for the convenience of description, it is illustrated that a plurality of first structures 541 and a plurality of second structures 742 are driven as light blocking units and the plurality of first structures 541 and the plurality of second structures 742 are illustrated with black. The viewing angle varying film 800 of FIG. 8B is different from the viewing angle varying film 700 of FIG. 8A only in the presence of a plurality of third structures 843, among the configurations of the viewing angle varying layer 840 and a third sub electrode 250c, among the configurations of the second electrode 250. However, other components are substantially the same so that a redundant description will be omitted. In FIG. 8B, for the convenience of description, it is illustrated that a plurality of first structures 541, a plurality of second structures 742, and a plurality of third structures 843 are driven as light blocking units and they are illustrated with black.

Referring to FIG. 8A, for example, a cross-sectional shape of the plurality of first structures 541 may be a trapezoid and a cross-sectional shape of the plurality of second structures 742 may be a rectangle. At this time, a height of the plurality of second structures 742 may be lower than a height of the plurality of first structures 541.

That is, the plurality of first structures 541 or the plurality of second structures 742 with different shapes or heights are driven as the light transmitting unit or the light blocking unit depending on the requested viewing angle characteristic, so that various viewing angle modes may be implemented. That is, when the plurality of first structures 541 are driven as a light blocking unit without the second structures 742 being driven, a narrower viewing angle may be implemented as compared with a case that only the plurality of second structures 742 are driven as a light blocking unit. Further, a left surface, a right surface, a top surface, and a bottom surface of the plurality of first structures 541 are not symmetric to each other so that when the plurality of first structures 541 are driven as a light blocking unit, light which passes through the viewing angle varying layer 740 may be tilted to a specific direction. That is, the viewing angle may be adjusted to a specific direction.

That is, in the viewing angle varying film 700 according to still another exemplary embodiment of the present disclosure, the viewing angle varying layer 740 includes a plurality of first structures 541 and a plurality of second structures 742 which have different shapes and different heights. At this time, the plurality of first structures 541 may be separately driven by the first sub electrode 150a and the plurality of second structures 742 may be separately driven by the second sub electrode 150b. Accordingly, in the viewing angle varying film 700 according to still another exemplary embodiment of the present disclosure, the plurality of first structures 541 or the plurality of second structures 742 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 700 according to still another exemplary embodiment of the present disclosure, the viewing angle varying layer 740 includes a plurality of first structures 541 having a trapezoidal cross-section. That is, a left surface and a right surface of the plurality of first structures 541 may be asymmetrical. Therefore, light which passes through the viewing angle varying layer 740 may be tilted to a specific direction. That is, the viewing angle may be adjusted to a specific direction.

Referring to FIG. 8B, the viewing angle varying layer 840 includes a plurality of first structures 541, a plurality of second structures 742, a plurality of third structures 843, and a transparent layer 145.

The plurality of first structures 541, the plurality of second structures 742, the plurality of third structures 843, and the transparent layer 145 may be alternately disposed along one direction. That is, the plurality of first structures 541, the plurality of second structures 742, and the plurality of third structures 843 may be alternately disposed from one side.

The plurality of first structures 541, the plurality of second structures 742, and the plurality of third structures 843 may be alternately disposed to be spaced apart from each other with a predetermined interval. At this time, the plurality of first structures 541, the plurality of second structures 742, and the plurality of third structures 843 may be disposed so as to extend in the same direction on the plane.

Similar to the plurality of first structures 541 and the plurality of second structures 742, the plurality of third structures 843 includes a polymer, a plurality of droplets dispersed in the polymer, and a plurality of colored particles dispersed in the plurality of droplets. That is, the plurality of first structures 541, the plurality of second structures 742, and the plurality of third structures 843 may be configured by polymer dispersion liquid crystal (PDLC), but are not limited thereto. That is, similar to the plurality of first structures 541 and the plurality of second structures 742, the plurality of third structures 843 may also be switched to the light transmitting unit or the light blocking unit depending on whether to apply a voltage.

At this time, in order to not only switch the viewing angle varying layer 840 to the light transmitting unit or the light blocking unit, but also vary the viewing angle, the plurality of first structures 541, the plurality of second structures 742, and the plurality of third structures 843 may be configured to be different. Specifically, at least one of a height, a width, and a shape of the plurality of first structures 541, the plurality of second structures 742, and the plurality of third structures 843 may be different. Specifically, a cross-section of the plurality of third structures 843 is a rectangle and a shape and a height of the plurality of third structures 843 may be different from those of the plurality of first structures 541 and a height of the plurality of third structures 843 may be different from the height of the plurality of second structures 742. That is, the plurality of first structures 541, the plurality of second structures 742, or the plurality of third structures 843 with different shapes or heights is driven as the light transmitting unit or the light blocking unit depending on the requested viewing angle characteristic, so that various viewing angle modes may be implemented. For example, the plurality of first structures 541 having the largest height and having a trapezoidal shape may be driven as the light blocking unit without the second and third structures 742, 843 being driven. At this time, a narrower viewing angle may be implemented as compared with a case that the plurality of second structures 742 or the plurality of third structures 843 is driven as the light blocking unit. Further, the viewing angle may be adjusted to a specific direction. In the meantime, the plurality of third structures 843 having the smallest height may be driven as the light blocking unit without the first and second structures 541, 742 being driven. At this time, a wider viewing angle may be implemented as compared with a case that the plurality of first structures 541 or the plurality of second structures 742 is driven as the light blocking unit.

A second electrode 250 may be disposed on the viewing angle varying layer 840. The second electrode 150 includes a first sub electrode 150a, a second sub electrode 150b, and a third sub electrode 250c.

Specifically, the first sub electrode 150a is disposed to overlap the plurality of first structures 541 to apply a voltage to the colored particles of the plurality of first structures 541. That is, the plurality of first structures 541 may be driven as the light transmitting unit or the light blocking unit depending on whether to apply the voltage to the first sub electrode 150a. The second sub electrode 150b is disposed to overlap the plurality of second structures 742 to apply a voltage to the colored particles of the plurality of second structures 742. That is, the plurality of second structures 742 may be driven as the light transmitting unit or the light blocking unit depending on whether to apply the voltage to the second sub electrode 150b. The third sub electrode 250c is disposed to overlap the plurality of third structures 843 to apply a voltage to the colored particles of the plurality of third structures 843. That is, the plurality of third structures 843 may be driven as the light transmitting unit or the light blocking unit depending on whether to apply the voltage to the third sub electrode 250c. Therefore, the first sub electrode 150a, the second sub electrode 150b, and the third sub electrode 250c of the second electrode 250 may be alternately disposed on the plane.

In the viewing angle varying film 800 according to still another exemplary embodiment of the present disclosure, the viewing angle varying layer 840 further includes not only the plurality of first structures 541 and the plurality of second structures 742 which have different heights, but also a plurality of third structures 843. At this time, the plurality of first structures 541 may be separately driven by the first sub electrode 150a, the plurality of second structures 742 may be separately driven by the second sub electrode 150b, and the plurality of third structures 843 may be separately driven by the third sub electrode 250c. Accordingly, in the viewing angle varying film 800 according to still another exemplary embodiment of the present disclosure, not only the plurality of first structures 541 or the plurality of second structures 742, but also the plurality of third structures 843 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 800 according to still another exemplary embodiment of the present disclosure, the viewing angle varying layer 840 includes a plurality of first structures 541 having a trapezoidal cross-section. That is, a left surface and a right surface of the plurality of first structures 541 may be asymmetrical. Therefore, light which passes through the viewing angle varying layer 840 may be tilted to a specific direction. That is, the viewing angle may be adjusted to a specific direction.

Figure 9A:
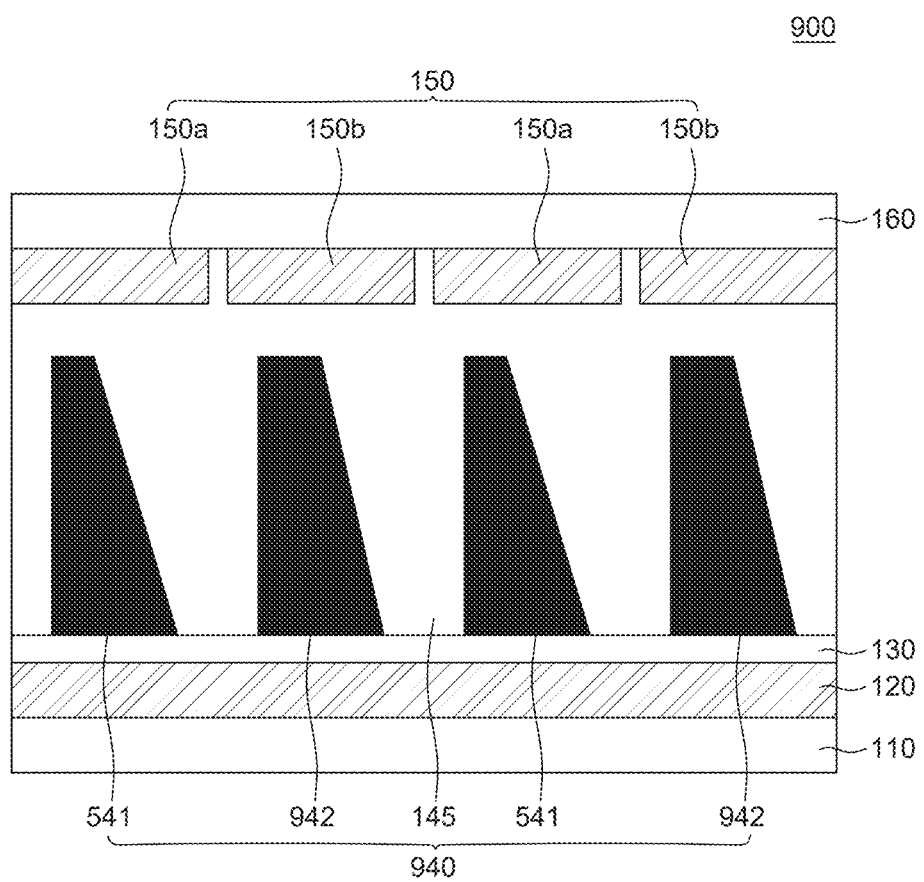
FIGS. 9A to 9C are cross-sectional views of a viewing angle varying film according to still another exemplary embodiment of the present disclosure.
Figure 9B:
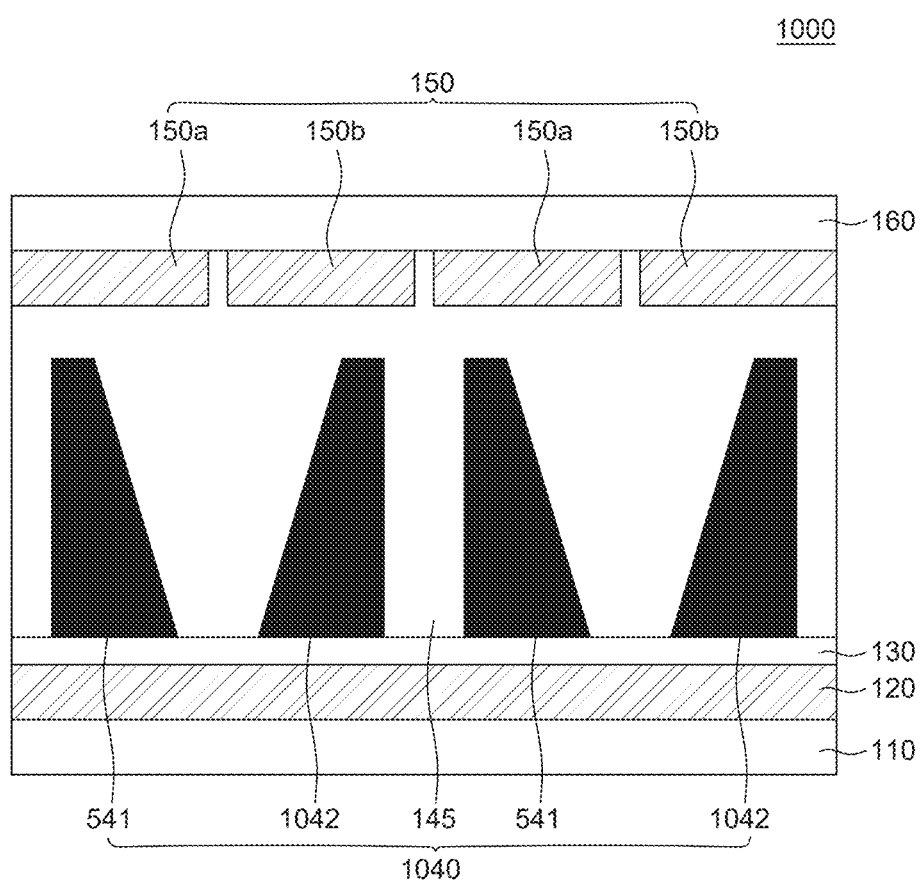
Figure 9C:
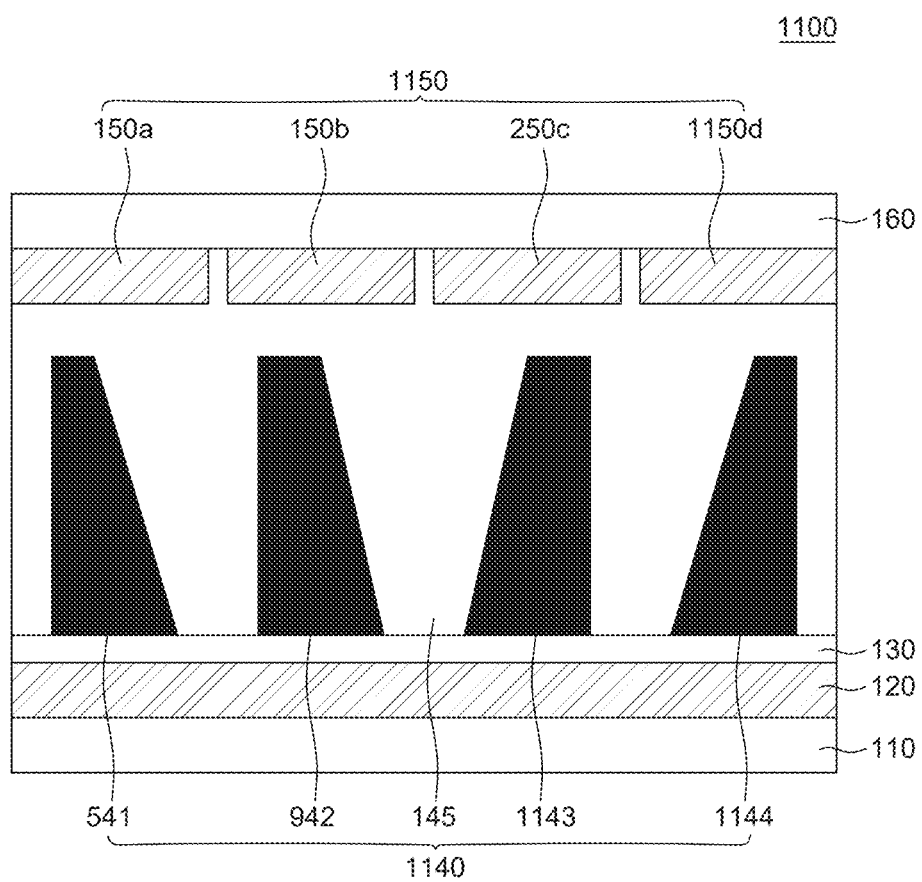

FIGS. 9A to 9C are cross-sectional views of a viewing angle varying film according to still another exemplary embodiment of the present disclosure. In the viewing angle varying film 900 of FIG. 9A, only a shape of the plurality of second structures 942 is different from that of the viewing angle varying film 500 of FIG. 7A, but other components are substantially the same, so that a redundant description will be omitted. In the viewing angle varying film 1000 of FIG. 9B, only a shape of the plurality of second structures 1042 is different from that of the viewing angle varying film 900 of FIG. 9A, but other components are substantially the same, so that a redundant description will be omitted. In FIGS. 9A and 9B, for the convenience of description, it is illustrated that a plurality of first structures 541 and a plurality of second structures 142 are driven as light blocking units and the plurality of first structures 541 and the plurality of second structures 142 are illustrated with black. The viewing angle varying film 1100 of FIG. 9C is different from the viewing angle varying film 900 of FIG. 9A only in the presence of a plurality of third structures 1143 and a plurality of fourth structures 1144, among the configurations of the viewing angle varying layer 1140 and the presence of a third sub electrode 250c and a fourth sub electrode 1150d, among the configurations of the second electrode 1150. However, other components are substantially the same so that a redundant description will be omitted. In FIG. 9C, for the convenience of description, it is illustrated that a plurality of first structures 541, a plurality of second structures 942, a plurality of third structures 1143, and a plurality of fourth structures 1144 are driven as light blocking units and they are illustrated with black.

Referring to FIG. 9A, not only the plurality of first structures 541 but also the plurality of second structures 942 may have a trapezoidal cross-section.

At this time, one of side surfaces of the plurality of first structures 541 and the plurality of second structures 942 is vertical to the bottom surface and the other side may be inclined with respect to the bottom surface. For example, as illustrated in FIG. 9A, left surfaces of the plurality of first structures 541 and the plurality of second structures 942 may be vertical to the bottom surface and right surfaces may be inclined with respect to the bottom surface. That is, the inclined surface of the plurality of first structures 541 may be opposite to a vertical side surface of the plurality of second structures 942 and the inclined surface of the plurality of second structures 942 may be opposite to a vertical side surface of the plurality of first structures 541. However, in order to not only switch the viewing angle varying layer 940 to the light transmitting unit or the light blocking unit, but also vary the viewing angle, the plurality of first structures 541 and the plurality of second structures 942 may be configured to be different.

That is, the inclined surface of the plurality of first structures 541 and the inclined surface of the plurality of second structures 942 may have different inclinations. For example, the inclined surface of the plurality of first structures 541 may be tilted to the left side more than the inclined surface of the plurality of second structures 942. Therefore, when the plurality of first structures 541 is driven as a light blocking unit without the second structures 942 being driven, light which passes through the viewing angle varying layer 940 may be tilted to the left side more than the case that the plurality of second structures 942 are driven as a light blocking unit.

That is, in the viewing angle varying film 900 according to still another exemplary embodiment of the present disclosure, the viewing angle varying layer 940 includes a plurality of first structures 541 and a plurality of second structures 942 which have different shapes. At this time, the plurality of first structures 541 may be separately driven by the first sub electrode 150a and the plurality of second structures 942 may be separately driven by the second sub electrode 150b. Accordingly, in the viewing angle varying film 900 according to still another exemplary embodiment of the present disclosure, the plurality of first structures 541 or the plurality of second structures 942 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 900 according to still another exemplary embodiment of the present disclosure, the viewing angle varying layer 1040 includes a plurality of first structures 541 and a plurality of second structures 942 which have trapezoidal cross-sections and have different inclinations of the inclined surface. That is, the left surface and the right surface of the plurality of first structures 541 and the plurality of second structures 942 may be asymmetrical. Therefore, light which passes through the viewing angle varying layer 940 may be tilted to a specific direction. That is, the viewing angle may be adjusted to a specific direction.

Referring to FIG. 9B, the plurality of first structures 541 and the plurality of second structures 1042 may have a trapezoidal cross-section. At this time, shapes of the plurality of first structures 541 and the plurality of second structures 1042 may be symmetric to each other. That is, as illustrated in FIG. 9B, a left surface of the plurality of first structures 541 may be vertical to the bottom surface and a right surface may be inclined with respect to the bottom surface. In contrast, a right surface of the plurality of second structures 1042 may be vertical to the bottom surface and a left surface may be inclined with respect to the bottom surface.

That is, when the plurality of first structures 541 is driven as the light blocking unit, light which passes through the viewing angle varying layer 1040 may be tilted to the left side and when the plurality of second structures 1042 is driven as the light blocking unit, light may be tilted to the right side.

That is, in the viewing angle varying film 1000 according to still another exemplary embodiment of the present disclosure, the viewing angle varying layer 1040 includes a plurality of first structures 541 and a plurality of second structures 1042 which have different shapes. At this time, the plurality of first structures 541 may be separately driven by the first sub electrode 150a and the plurality of second structures 1042 may be separately driven by the second sub electrode 150b. Accordingly, in the viewing angle varying film 1000 according to still another exemplary embodiment of the present disclosure, the plurality of first structures 541 or the plurality of second structures 1042 may be selectively utilized as the light transmitting unit or the light blocking unit. Therefore, various viewing angle characteristics according to the requirements of the user may be satisfied.

That is, it is not necessary to manufacture various molds according to the requirements of the user so that the manufacturing cost may be saved.

Specifically, in the viewing angle varying film 1000 according to still another exemplary embodiment of the present disclosure, the viewing angle varying layer 1040 includes a plurality of first structures 541 and a plurality of second structures 1042 which have trapezoidal cross-sections and are symmetrical to each other. That is, the plurality of first structures 541 and the plurality of second structures 1042 may have inclined surfaces in opposite directions. Therefore, the viewing angle may be adjusted not only to the specific direction, but also to an opposite direction thereto.

Referring to FIG. 9C, the viewing angle varying layer 1140 may include a plurality of first structures 541, a plurality of second structures 142, a plurality of third structures 1143, a plurality of fourth structures 1144, and a transparent layer 145.

The plurality of first structures 541, the plurality of second structures 142, the plurality of third structures 1143, the plurality of fourth structures 1144, and the transparent layer 145 may be alternately disposed along one direction. That is, the plurality of first structures 541, the plurality of second structures 142, the plurality of third structures 1143, and the plurality of fourth structures 1144 may be alternately disposed from one side.

The plurality of first structures 541, the plurality of second structures 142, the plurality of third structures 1143, and the plurality of fourth structures 1144 may be spaced apart from each other with a predetermined interval to be disposed alternately. At this time, the plurality of first structures 541, the plurality of second structures 142, the plurality of third structures 1143, and the plurality of fourth structures 1144 may be disposed so as to extend in the same direction on the plane.

Similar to the plurality of first structures 541 and the plurality of second structures 142, the plurality of third structures 1143 and the plurality of fourth structures 1144 include a polymer, a plurality of droplets dispersed in the polymer, and a plurality of colored particles dispersed in the plurality of droplets. That is, the plurality of first structures 541, the plurality of second structures 142, the plurality of third structures 1143, and the plurality of fourth structures 1144 may be configured by polymer dispersion liquid crystal (PDLC), but are not limited thereto. That is, similar to the plurality of first structures 541 and the plurality of second structures 142, the plurality of third structures 1143 and the plurality of fourth structures 1144 may also be switched to the light transmitting unit or the light blocking unit depending on whether to apply a voltage.

At this time, in order to not only switch the viewing angle varying layer 1140 to the light transmitting unit or the light blocking unit, but also vary the viewing angle, the plurality of first structures 541, the plurality of second structures 142, the plurality of third structures 1143, and the plurality of fourth structures 1144 may be configured to be different. Referring to FIG. 9C, for example, the plurality of third structures 1143 may be formed to have a symmetric shape to the plurality of first structures 541. The plurality of fourth structures 1144 may be formed to have a symmetric shape to the plurality of second structures 142. That is, the left surfaces of the plurality of third structures 1143 and the plurality of fourth structures 1144 may be inclined with respect to the bottom surface and the right surfaces may be vertical to the bottom surface. That is, the inclined surface of the plurality of third structures 1143 may be opposite to a vertical side surface of the plurality of fourth structures 1144 and the inclined surface of the plurality of second structures 1144 may be opposite to a vertical side surface of the plurality of third structures 1143. In addition, the inclined surface of the plurality of third structures 1143 and the inclined surface of the plurality of fourth structures 1144 may have different inclinations. That is, when the plurality of first structures 541 or the plurality of second structures 142 are driven as the light blocking units, light which passes through the viewing angle varying layer 1140 may be tilted to the left side. In contrast, when the plurality of third structures 1143 or the plurality of fourth structures 1144 are driven as the light blocking units, light which passes through the viewing angle varying layer 1140 may be inclined to the right side. At this time, the inclined surface of the plurality of fourth structures 1144 may be further tilted to the right side so that when the plurality of fourth structures is driven as a light blocking unit, light may be tilted to the right side more than the case that the plurality of third structures 1143 is driven as a light blocking unit.

A second electrode 150 may be disposed on the viewing angle varying layer 1140. The second electrode 150 may include a first sub electrode 150a, a second sub electrode 150b, and a third sub electrode 250c.

Specifically, the first sub electrode 150a is disposed to overlap the plurality of first structures 541 to apply a voltage to the colored particles of the plurality of first structures 541. That is, the plurality of first structures 541 may be driven as the light transmitting unit or the light blocking unit depending on whether to apply the voltage to the first sub electrode 150a. The second sub electrode 150b is disposed to overlap the plurality of second structures 142 to apply a voltage to the colored particles of the plurality of second structures 142. That is, the plurality of second structures 142 may be driven as the light transmitting unit or the light blocking unit depending on whether to apply the voltage to the second sub electrode 150b. The third sub electrode 250c is disposed to overlap the plurality of third structures 1143 to apply a voltage to the colored particles of the plurality of third structures 1143. That is, the plurality of third structures 1143 may be driven as the light transmitting unit or the light blocking unit depending on whether to apply the voltage to the third sub electrode 250c. The fourth sub electrode 1150d is disposed to overlap the plurality of fourth structures 1144 to apply a voltage to the colored particles of the plurality of fourth structures 1144. That is, the plurality of fourth structures 1144 may be driven as the light transmitting unit or the light blocking unit depending on whether to apply the voltage to the fourth sub electrode 1150d. Therefore, the first sub electrode 150a, the second sub electrode 150b, the third sub electrode 250c, and the fourth sub electrode 1150d of the second electrode 150 may be alternately disposed on the plane.

That is, in the viewing angle varying film 1100 according to still another exemplary embodiment of the present disclosure, the viewing angle varying layer 1140 includes a plurality of first structures 541, a plurality of second structures 142, a plurality of third structures 1143, and a plurality of fourth structures 1144 which have different shapes. At this time, the plurality of first structures 541 may be separately driven by the first sub electrode 150a and the plurality of second structures 142 may be separately driven by the second sub electrode 150b. The plurality of third structures 1143 may be separately driven by the third sub electrode 250c and the plurality of fourth structures 1144 may be separately driven by the fourth sub electrode 1150d. Accordingly, in the viewing angle varying film 1100 according to still another exemplary embodiment of the present disclosure, the plurality of first structures 541, the plurality of second structures 142, the plurality of third structures 1143, or the plurality of fourth structures 1144 may be selectively utilized as the light transmitting unit or the light blocking unit. Therefore, various viewing angle characteristics according to the requirements of the user may be satisfied. That is, it is not necessary to manufacture various molds according to the requirements of the user so that the manufacturing cost may be saved.

Specifically, in the viewing angle varying film 1100 according to still another exemplary embodiment of the present disclosure, the viewing angle varying layer 1140 includes a plurality of third structures 1143 and a plurality of fourth structures 1144 which have a trapezoidal cross section. The plurality of third structures 1143 is symmetrical to the plurality of first structures 541 and the plurality of fourth structures 1144 is symmetrical to the plurality of second structures 142. That is, the plurality of first structures 541 and the plurality of third structures 1143 may have inclined surfaces in an opposite direction and the plurality of second structures 142 and the plurality of fourth structures 1144 may have inclined surfaces in an opposite direction. Therefore, the viewing angle may be adjusted not only to the specific direction, but also to an opposite direction thereto.

Figure 10A:
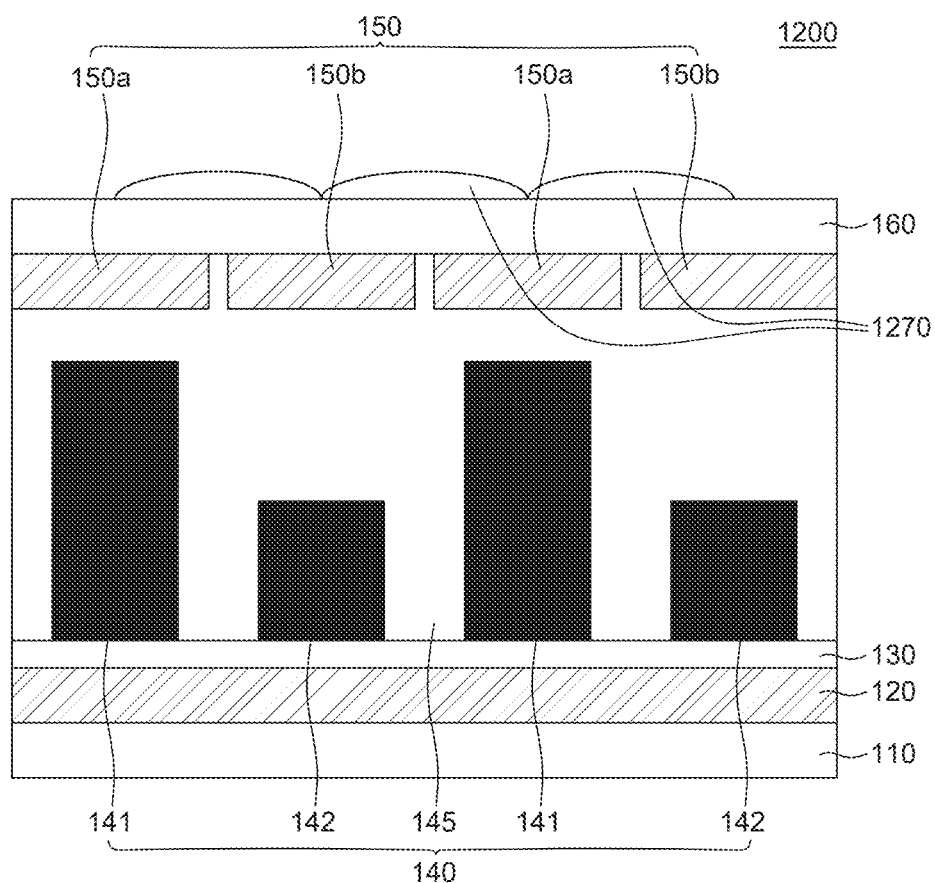
FIGS. 10A and 10B are cross-sectional views of a viewing angle varying film according to still another exemplary embodiment of the present disclosure.
Figure 10B:
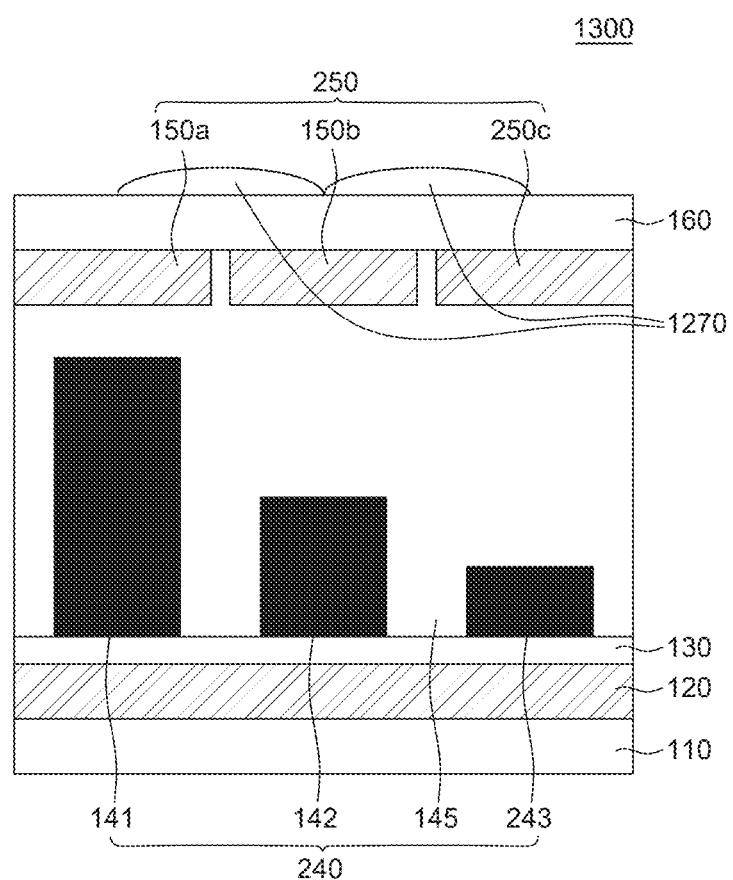
Figure 11A:
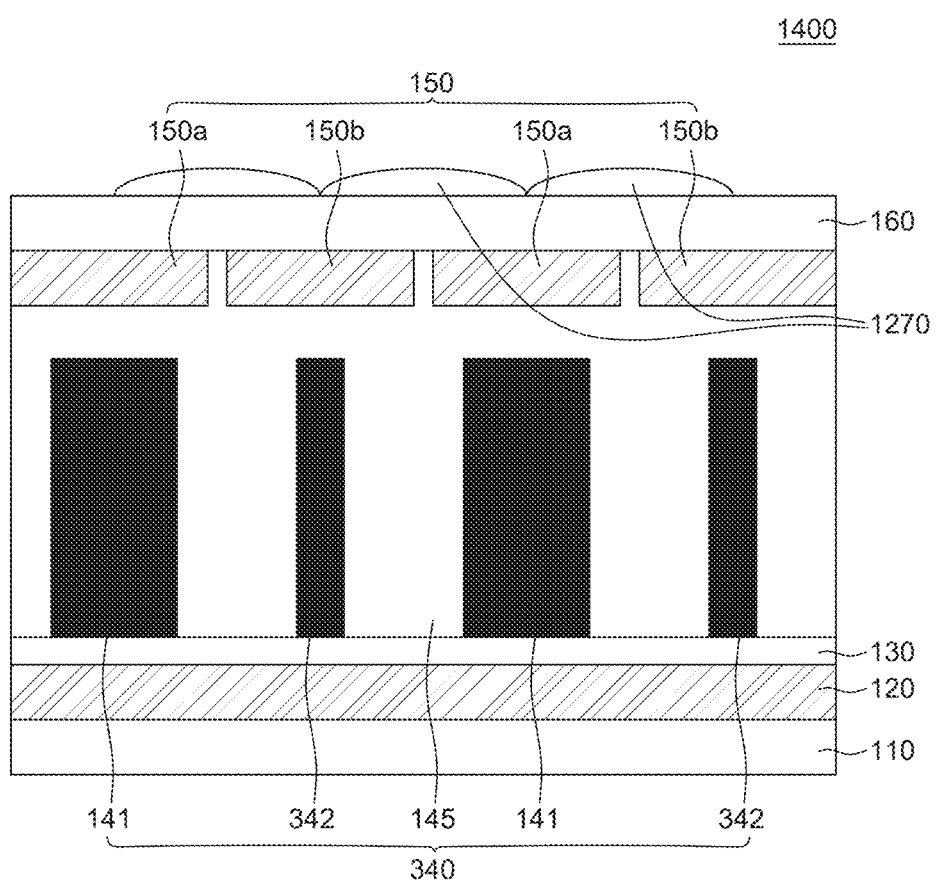
FIGS. 11A and 11B are cross-sectional views of a viewing angle varying film according to still another exemplary embodiment of the present disclosure.
Figure 11B:
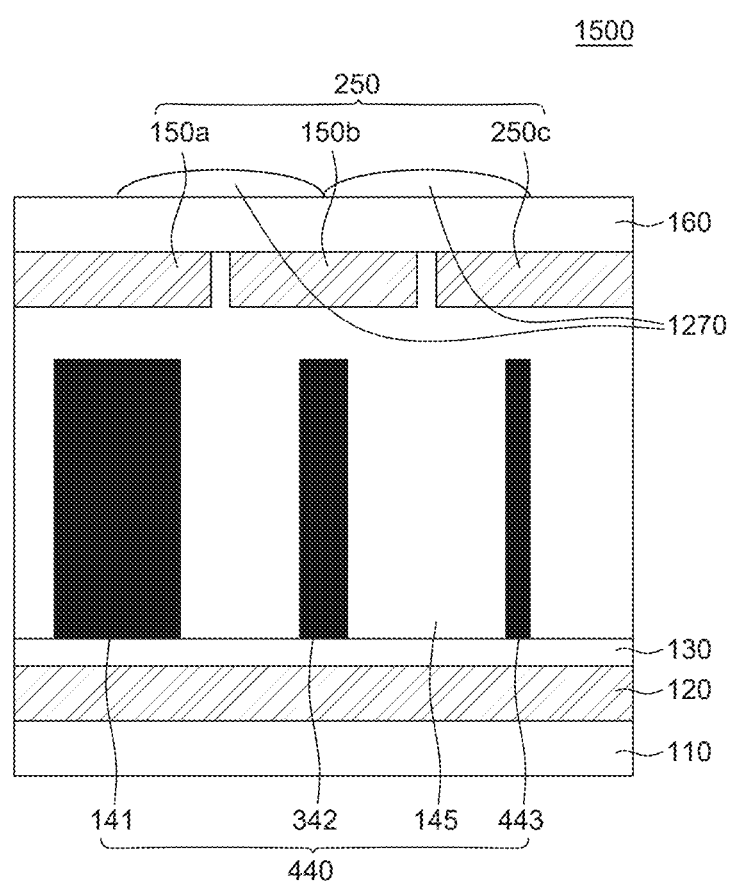
Figure 12A:
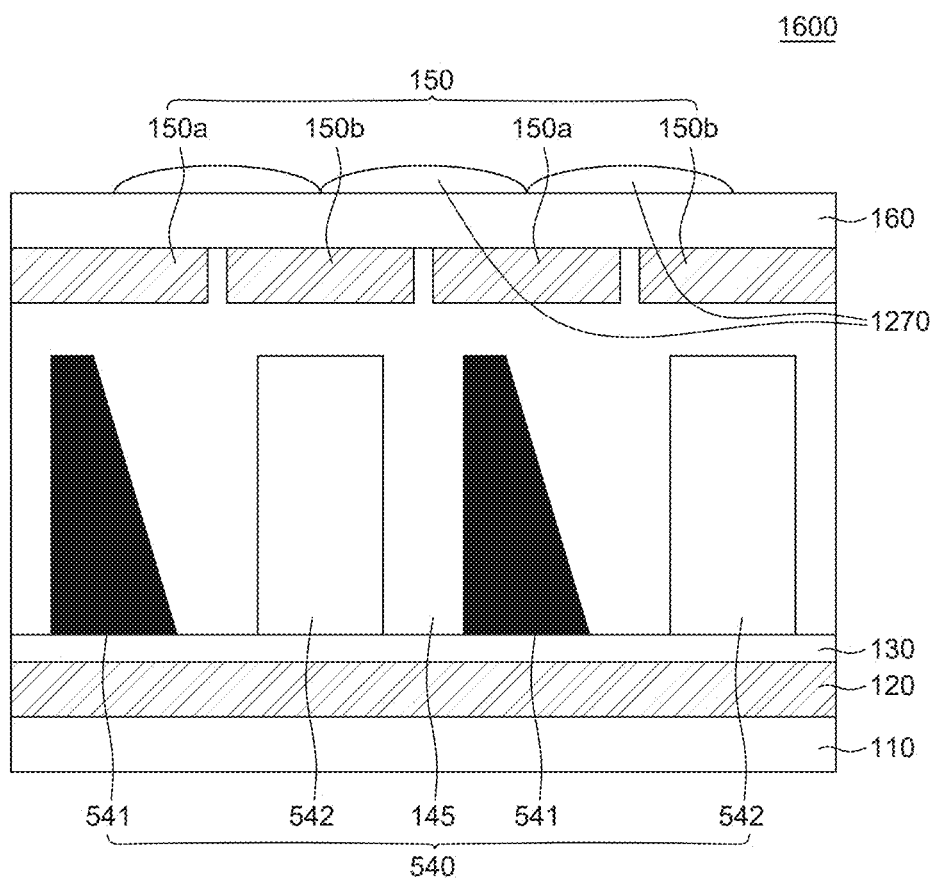
FIGS. 12A and 12B are cross-sectional views of a viewing angle varying film according to still another exemplary embodiment of the present disclosure.
Figure 12B:
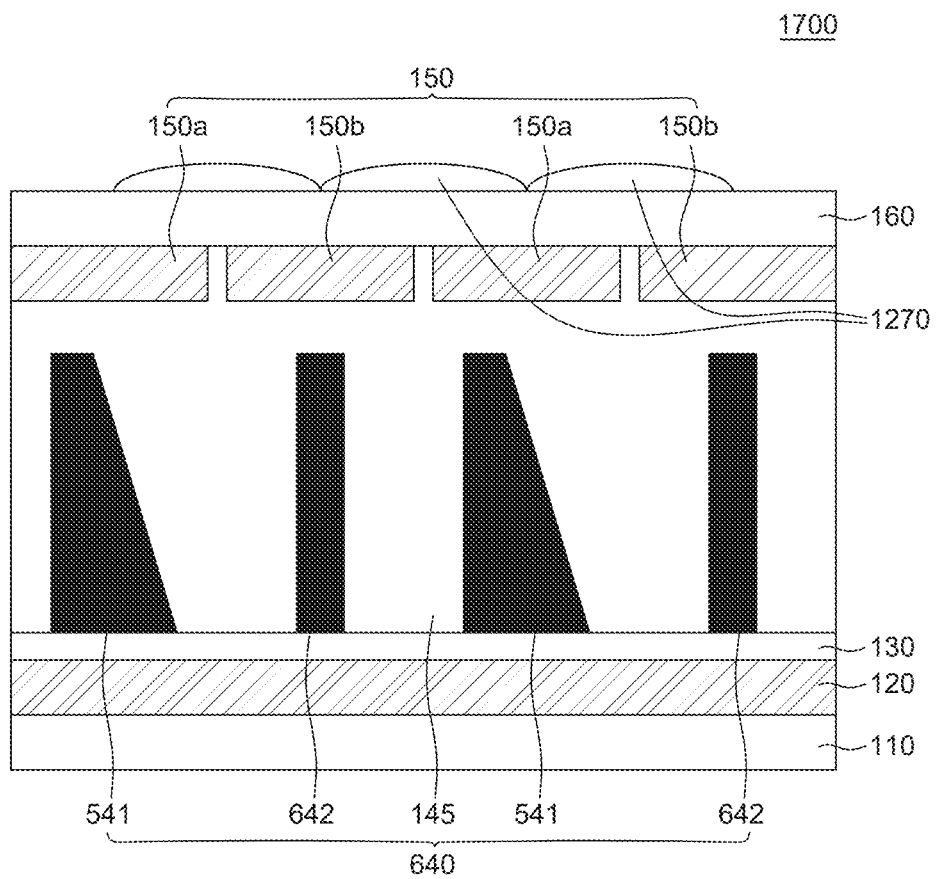
Figure 13A:
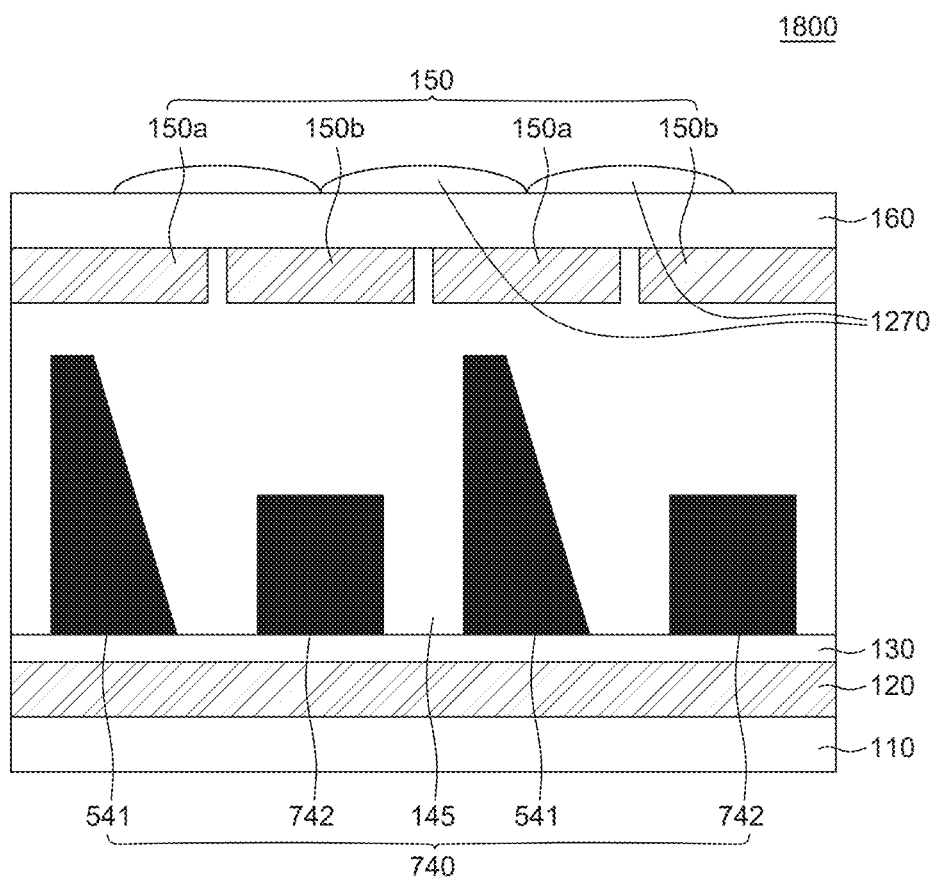
FIGS. 13A and 13B are cross-sectional views of a viewing angle varying film according to still another exemplary embodiment of the present disclosure.
Figure 13B:
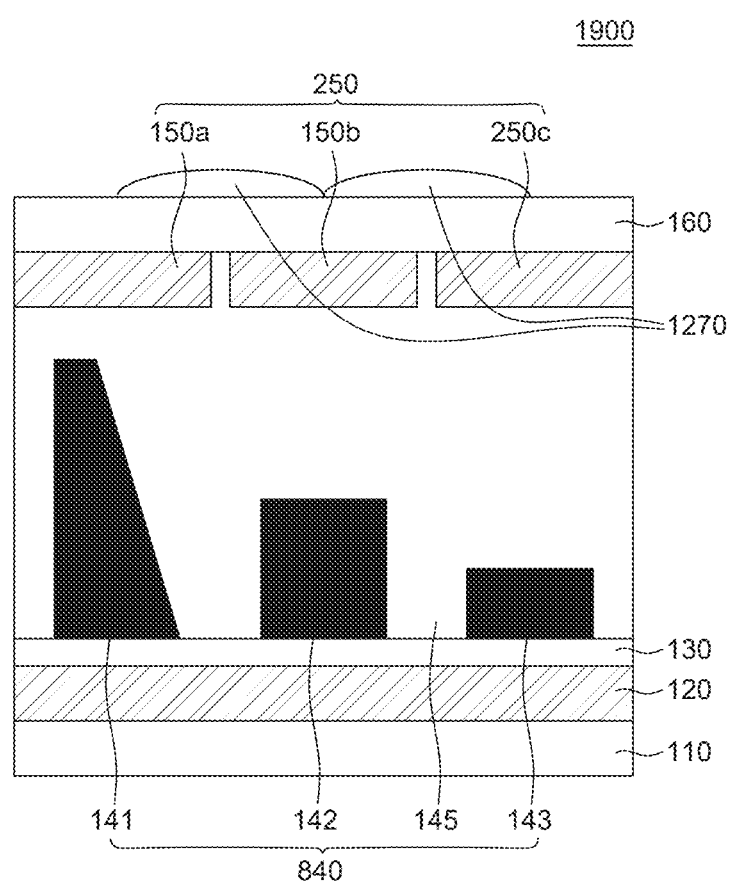
Figure 14A:
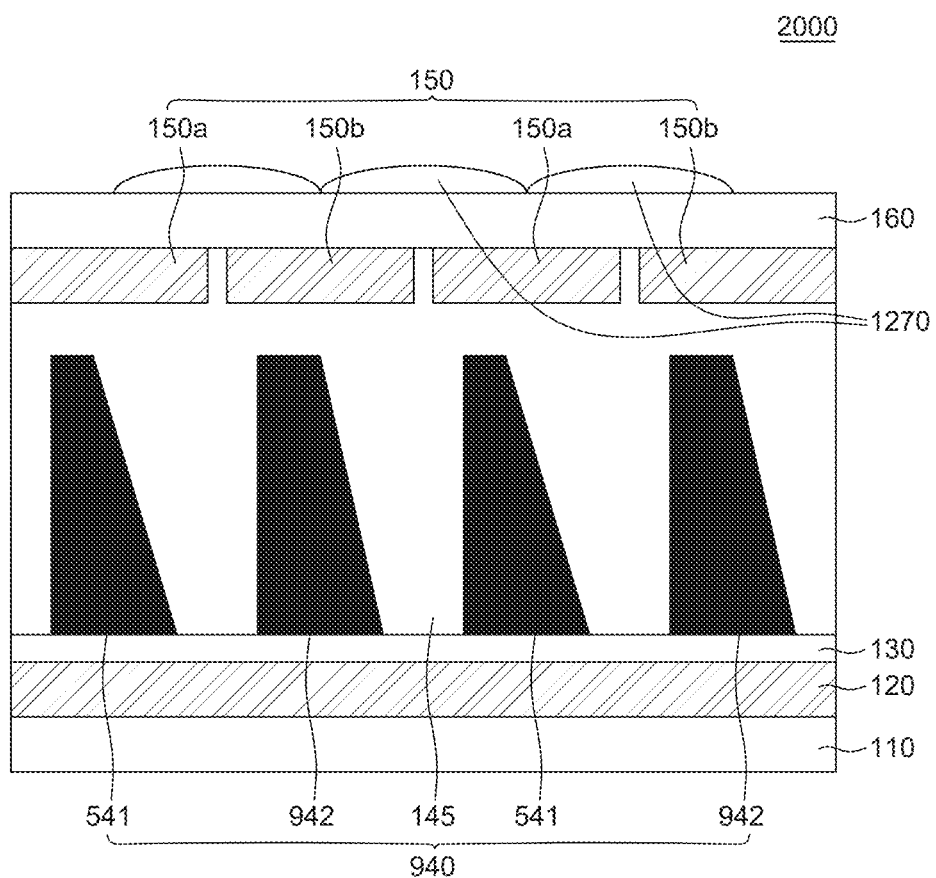
FIGS. 14A to 14C are cross-sectional views of a viewing angle varying film according to still another exemplary embodiment of the present disclosure.
Figure 14B:
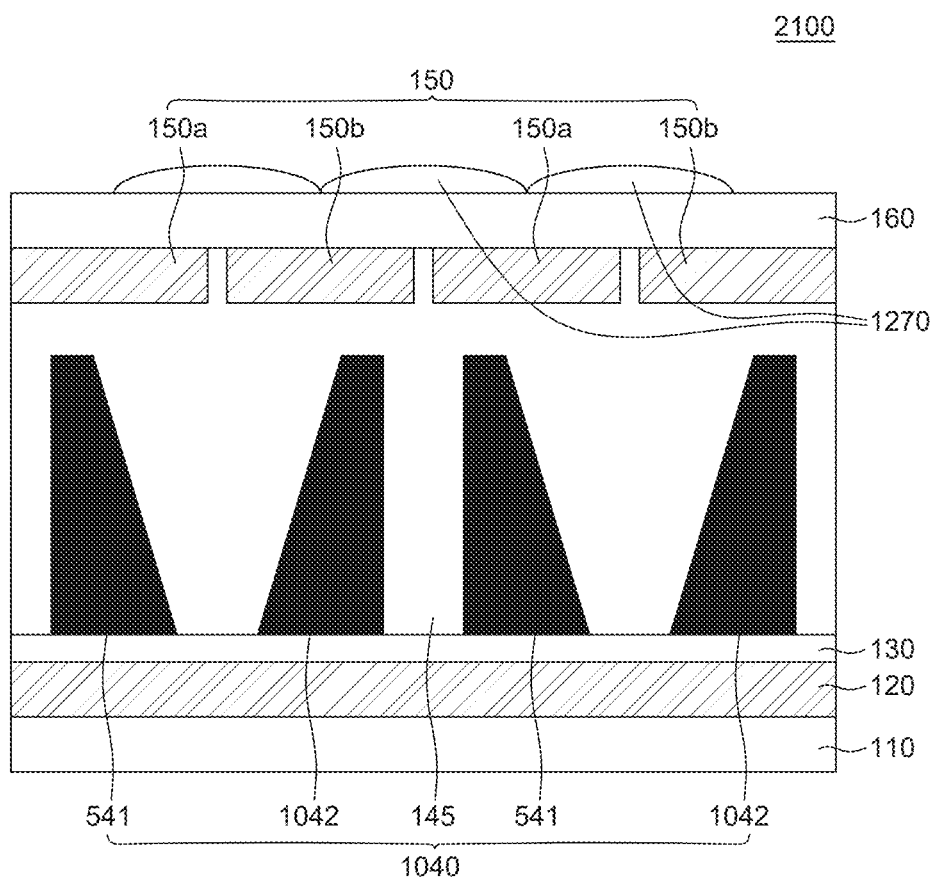
Figure 14C:
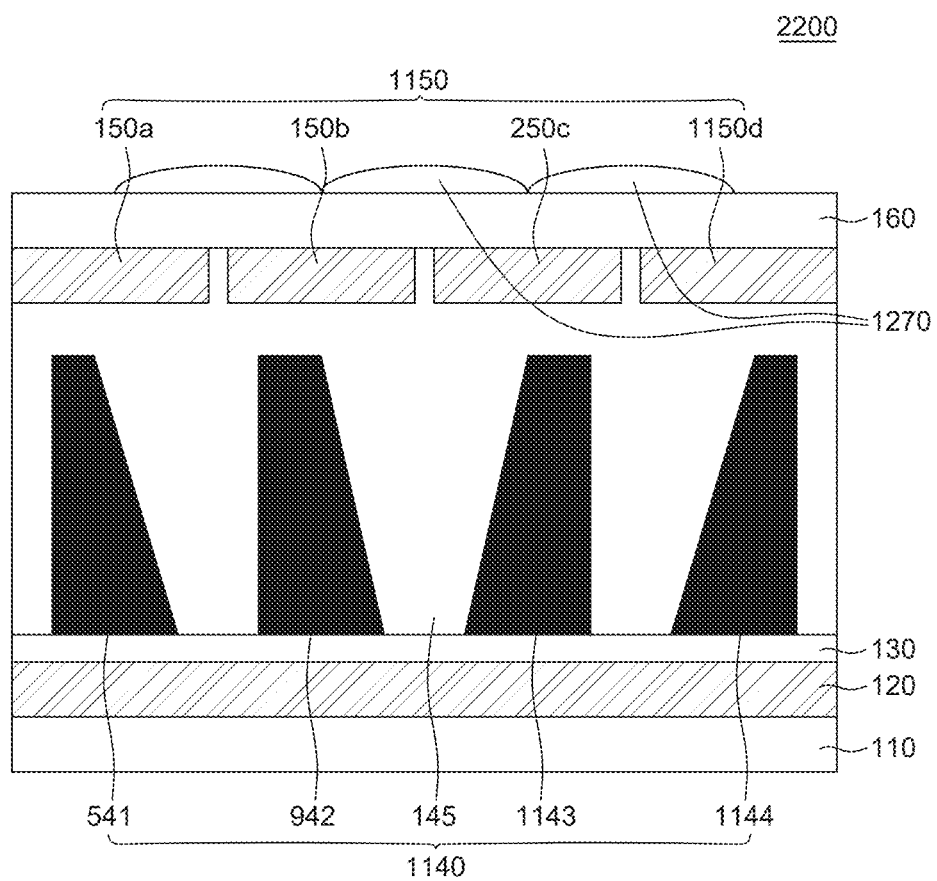

FIGS. 10A and 10B are cross-sectional views of a viewing angle varying film according to still another exemplary embodiment of the present disclosure. FIGS. 11A and 11B are cross-sectional views of a viewing angle varying film according to still another exemplary embodiment of the present disclosure. FIGS. 12A and 12B are cross-sectional views of a viewing angle varying film according to still another exemplary embodiment of the present disclosure. FIGS. 13A and 13B are cross-sectional views of a viewing angle varying film according to still another exemplary embodiment of the present disclosure. FIGS. 14A to 14C are cross-sectional views of a viewing angle varying film according to still another exemplary embodiment of the present disclosure.

A viewing angle varying film 1200 of FIG. 10A, a viewing angle varying film 1300 of FIG. 10B, a viewing angle varying film 1400 of FIG. 11A, a viewing angle varying film 1500 of FIG. 11B, a viewing angle varying film 1600 of FIG. 12A, a viewing angle varying film 1700 of FIG. 12B, a viewing angle varying film 1800 of FIG. 13A, a viewing angle varying film 1900 of FIG. 13B, a viewing angle varying film 2000 of FIG. 14A, a viewing angle varying film 2100 of FIG. 14B, and a viewing angle varying film 2200 of FIG. 14C are different from the viewing angle varying film 100 of FIG. 3A, the viewing angle varying film 200 of FIG. 4, the viewing angle varying film 300 of FIG. 5A, the viewing angle varying film 400 of FIG. 5B, the viewing angle varying film 500 of FIG. 7A, the viewing angle varying film 600 of FIG. 7B, the viewing angle varying film 700 of FIG. 8A, the viewing angle varying film 800 of FIG. 8B, the viewing angle varying film 900 of FIG. 9A, the viewing angle varying film 1000 of FIG. 9B, and the viewing angle varying film 1100 of FIG. 9C in the presence of a plurality of lenses 1270, respectively. Other components are substantially the same so that a redundant description will be omitted.

Referring to FIGS. 10A to 14C, a plurality of lenses 1270 may be disposed on the second film 160. The plurality of lenses 1270 condenses light to further narrow the viewing angle. Therefore, the refractive index of the plurality of lenses 1270 may be 1.4 to 1.7. At this time, centers of the plurality of lenses 1270 may be disposed to be aligned between adjacent sub electrodes of the second electrode 150.

When the second electrode 150 includes a plurality of first sub electrodes 150a and a plurality of second sub electrodes 150b, centers of the plurality of lenses 1270 may be aligned between the plurality of first sub electrodes 150a and the plurality of second sub electrodes 150b. When the second electrode 150 includes a plurality of third sub electrodes 250c, the centers of the plurality of lenses 1270 may be aligned between the plurality of first sub electrodes 150a and the plurality of second sub electrodes 150b and between the plurality of second sub electrodes 150b and the plurality of third sub electrodes 250c. When the second electrode 150 further includes fourth sub electrodes 1150d, the centers of the plurality of lenses 1270 may be aligned between the plurality of first sub electrodes 150a and the plurality of second sub electrodes 150b, between the plurality of second sub electrodes 150b and the plurality of third sub electrodes 250c, and between the plurality of third sub electrodes 250c and the plurality of fourth sub electrodes 1150d.

That is, the plurality of lenses 1270 are disposed so as to align the centers between the plurality of adjacent sub electrodes on the second film 160 to improve a degree of freedom of design of the viewing angle varying layer 140. That is, a center of each of the plurality of lenses 1270 is aligned with a space between a corresponding first sub electrode 150a from the plurality of first sub electrodes and a corresponding second sub electrode 150b from the plurality of second sub electrodes that is adjacent to the corresponding first sub electrode 150a.

Figure 15:
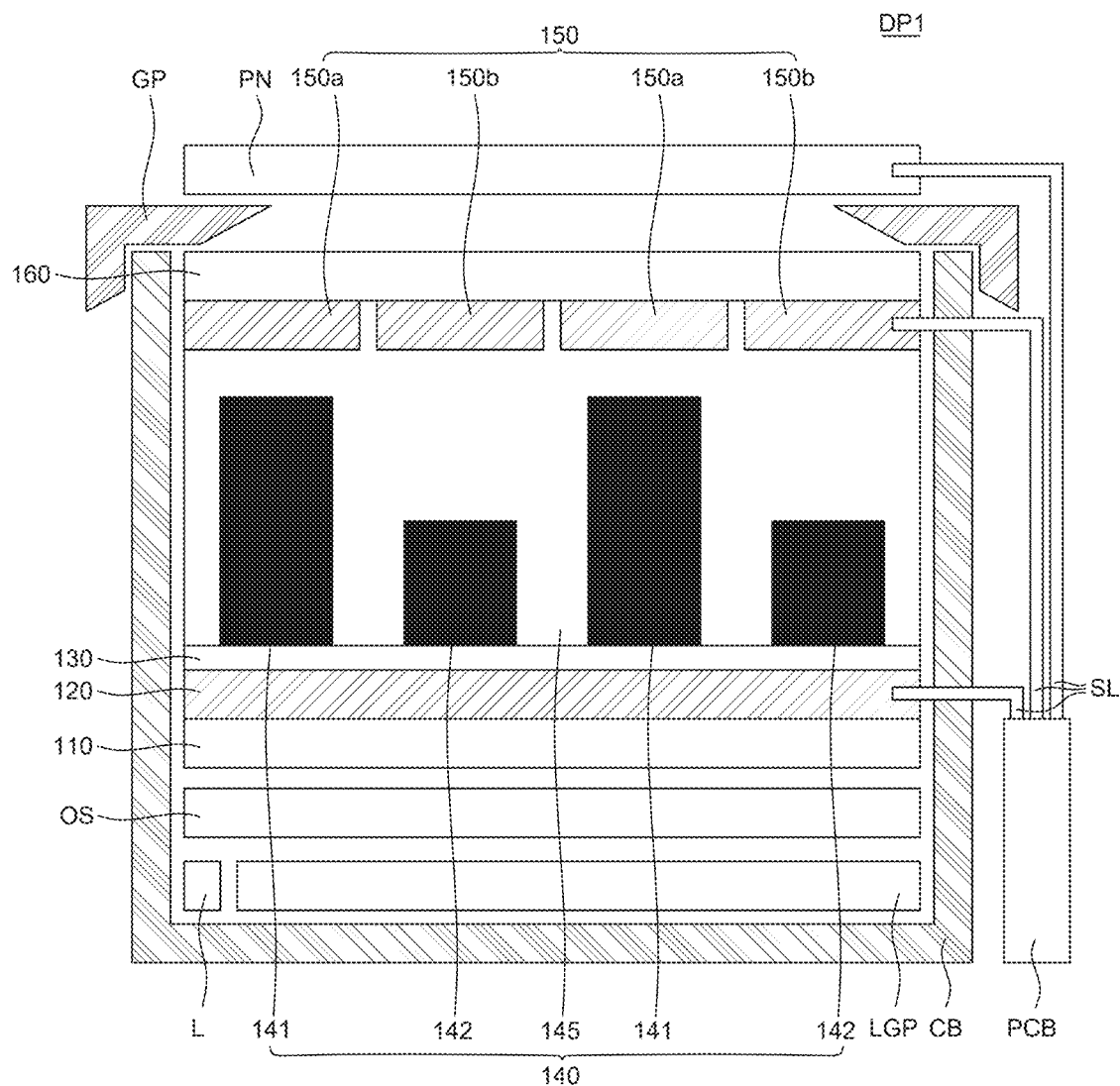
FIG. 15 is a cross-sectional view of a display device according to an exemplary embodiment of the present disclosure.

FIG. 15 is a cross-sectional view of a display device according to an exemplary embodiment of the present disclosure.

Referring to FIG. 15, a cover bottom CB may have a structure with an open top surface. The cover bottom CB may protect components in the cover bottom CB. The cover bottom CB is a metal material and serves to reinforce the rigidity of the inside of the cover bottom CB. Further, heat generated from a light source L may be finally discharged to the outside through the cover bottom CB.

The light source L may be disposed in the cover bottom CB. The light source may include at least one of cathode fluorescent lamp (CCFL), an external electrode fluorescent lamp (EEFL), and a light emitting diode (LED), but is not limited thereto.

A light guide plate LGP may be disposed on the same plane as the light source L in the cover bottom CB. The light guide plate GLP receives light emitted from the light source L to refract, scatter, and reflect the light to uniformly emit light upward. That is, the light guide plate LGP converts point light irradiated from the light source L into surface light to transmit the converted light to the display panel PN.

An optical sheet OS may be disposed on the light guide plate LGP. The optical sheet OS improves characteristics of light generated from the light source L. The optical sheet OS may include a diffusion sheet, a prism sheet, a protection sheet, and the like.

The viewing angle varying film 100 may be disposed on the optical sheet OS. In FIG. 15, it is illustrated that all the cross-sections of the plurality of first structures 141 and the plurality of second structures 142 are rectangle with the same width and different heights, but it is not limited thereto and any one or more of a shape, a width, and a height may be configured to be different.

The display panel PN may be disposed on the viewing angle varying film 100. Even though it is not illustrated in the drawing and the display panel PN is not illustrated in detail, the display panel may include a transistor substrate and a color filter substrate which are opposite to each other to be bonded to maintain a uniform cell gap and a liquid crystal layer interposed between two substrates. On the transistor substrate, a plurality of gate lines may be formed and a plurality of data lines which intersects the plurality of gate lines may be formed and the transistor may be disposed at the intersection of the gate line and the data line. That is, in the display device DP1 according to the exemplary embodiment of the present disclosure, the display panel PN may be a liquid crystal display panel. In the meantime, even though in FIG. 15, it is illustrated that the display panel PN is disposed above the viewing angle varying film 100, it is not limited thereto and the display panel PN may be disposed below the viewing angle varying film 100.

A guide panel GP may be disposed below the display panel PN. The guide panel GP accommodates components disposed below the display panel PN to support and fix the components and maintain the rigidity.

In the meantime, a printed circuit board PCB is connected to one end of a display device DP1. Even though it is not illustrated in the drawing, the printed circuit board PCB is connected to a flexible film to supply a signal to a driving IC of the flexible film. Various components may be disposed in the printed circuit board PCB to supply various driving signals such as a driving signal, a data voltage, etc. to the driving IC.

The signal line SL may connect the printed circuit board PCB to the first electrode 120, the second electrode 150, and the display panel PN.

Even though it is not illustrated in the drawing, the display device DP1 may include an illuminance sensor, etc. which senses predetermined external light to drive the viewing angle varying film 100 during a predetermined time period.

The display device DP1 according to the exemplary embodiment of the present disclosure includes a viewing angle varying film 100 and the viewing angle varying layer 140 of the viewing angle varying film 100 includes a plurality of first structures 141 and a plurality of second structures 142 which are different from each other. Accordingly, in the display device DP1 according to the exemplary embodiment of the present disclosure, any one or more of a shape, a width, and a height of the plurality of first structures 141 and the plurality of second structures 142 are designed to be different so that viewing angle in various modes may be implemented. Therefore, it is not necessary to manufacture various molds according to the requirements of the user so that a manufacturing cost may be saved.

Figure 16:
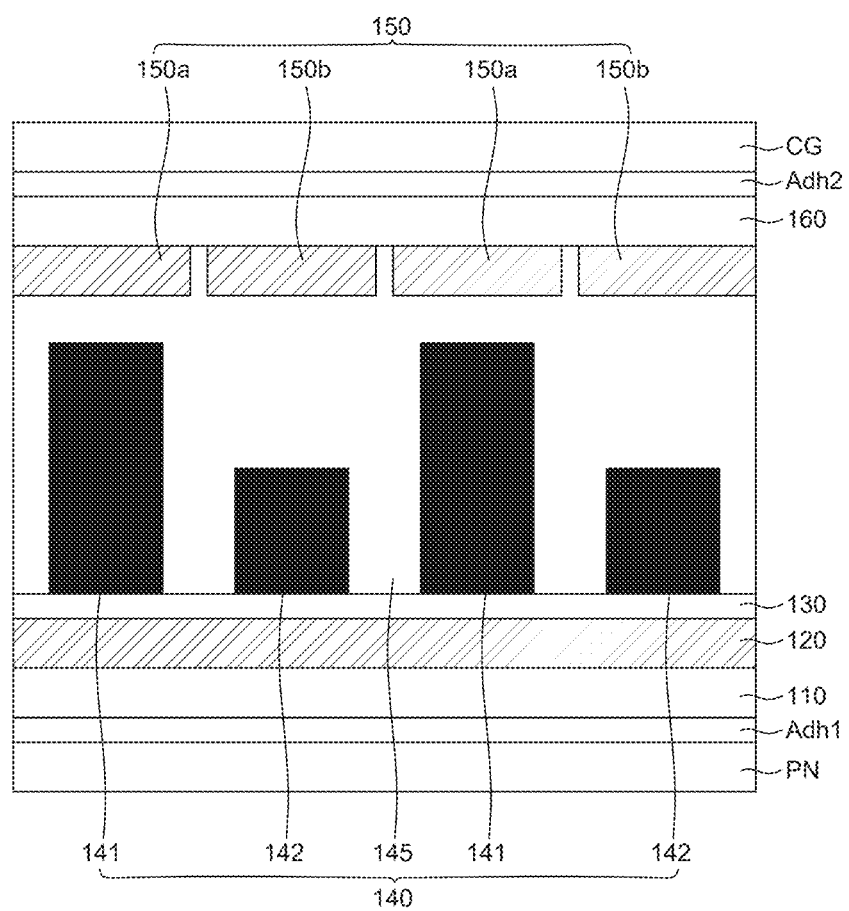
FIG. 16 is a cross-sectional view of a display device according to another exemplary embodiment of the present disclosure.

FIG. 16 is a cross-sectional view of a display device according to another exemplary embodiment of the present disclosure.

Referring to FIG. 16, the display panel PN may include a substrate, a transistor, and an organic light emitting diode. That is, in the display device DP1 according to another exemplary embodiment of the present disclosure, the display panel PN may be an organic light emitting display panel.

The substrate is a substrate which supports components disposed above the display device DP2 and may be an insulating substrate. For example, the substrate may be formed of glass, resin, or the like. Further, the substrate may include polymer or plastic. The substrate may be formed of a plastic material having flexibility. A plurality of pixels is formed on the substrate to display images.

A transistor for driving an organic light emitting diode may be disposed on the substrate. For example, the transistor may include a gate electrode, an active layer, a source electrode, and a drain electrode. Further, the transistor may further include a gate insulating layer which insulates the gate electrode from the active layer and an interlayer insulating layer which insulates the gate electrode from the source electrode and the drain electrode.

An organic light emitting diode may be disposed on the transistor.

A first adhesive layer Adh1 may be disposed on the display panel PN. The first adhesive layer Adh1 may use an optically clear adhesive (OCA) to allow the light to pass through, but is not limited thereto.

A viewing angle varying film 100 may be disposed on the first adhesive layer Adh1. In FIG. 16, it is illustrated that all the cross-sections of the plurality of first structures 141 and the plurality of second structures 142 are rectangles with the same width and different heights, but it is not limited thereto and any one or more of a shape, a width, and a height may be configured to be different.

A second adhesive layer Adh2 may be disposed on the viewing angle varying film 100. The second adhesive layer Adh2 may use an optically clear adhesive (OCA) to allow the light to pass through, but is not limited thereto.

A cover glass CG may be disposed on the second adhesive layer Adh2. The cover glass CG may protect the display panel PN so as not to be damaged by an external impact or deteriorated by moisture, oxygen, or foreign materials entering from the outside.

The display device DP2 according to another exemplary embodiment of the present disclosure includes a viewing angle varying film 100 and the viewing angle varying layer 140 of the viewing angle varying film 100 includes a plurality of first structures 141 and a plurality of second structures 142, respectively, which are different from each other. Accordingly, in the display device DP2 according to another exemplary embodiment of the present disclosure, any one or more of a shape, a width, and a height of the plurality of first structures 141 and the plurality of second structures 142 are designed to be different so that viewing angle in various modes may be implemented. Therefore, it is not necessary to manufacture various molds according to the requirements of the user so that a manufacturing cost may be saved.

Figure 17A:
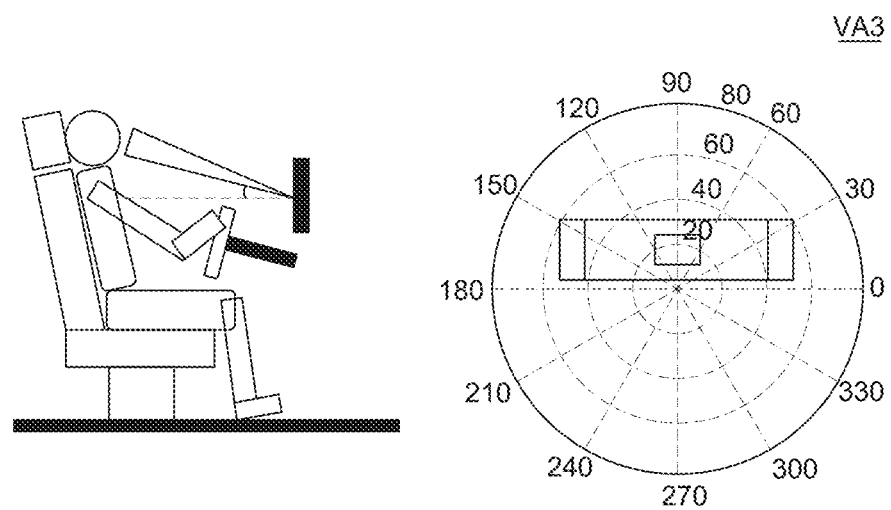
FIGS. 17A and 17B are views for explaining an example that a display device according to an exemplary embodiment of the present disclosure is utilized according to a body type of a user.
Figure 17B:
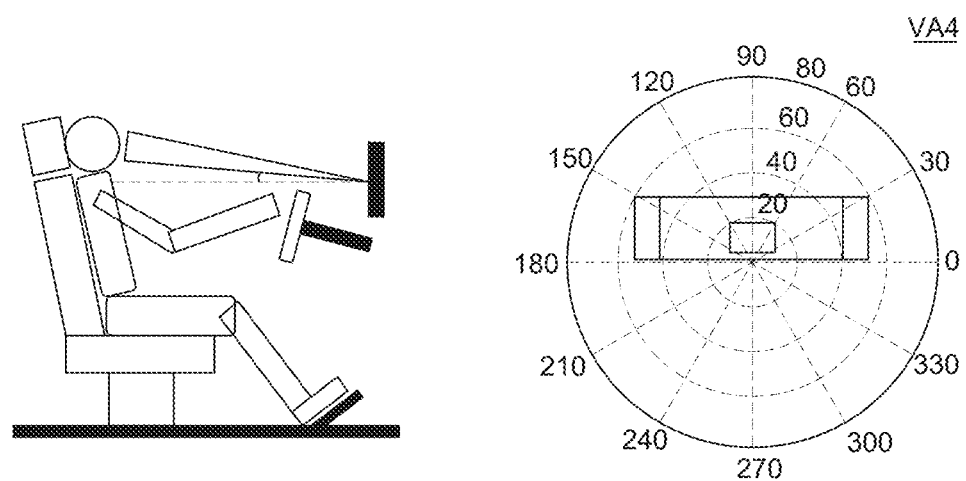

FIGS. 17A and 17B are views for explaining an example that a display device according to an exemplary embodiment of the present disclosure is utilized according to a body type of a user.

First, referring to FIG. 17A, a user may use a display which is applied to the inside of the vehicle in a more adjacent position. At this time, a third viewing angle VA3 may be implemented in accordance with the eye level of the user. That is, when a center of an outermost circle illustrated at a right side of FIG. 17A is 0°, a viewing angle which is narrowed to a range of 10° to 30° may be implemented.

Referring to FIG. 17B, a user may use the display which is applied to the inside of the vehicle in a longer distance. At this time, a fourth viewing angle VA4 may be implemented in accordance with the eye level of the user. That is, when a center of an outermost circle illustrated at a right side of FIG. 17B is 0°, a viewing angle which is narrowed to a range of 0° to 20° may be implemented.

The exemplary embodiments of the present disclosure can also be described as follows:

According to an aspect of the present disclosure, there is provided a viewing angle varying film. The viewing angle varying film includes a first film, a second film which is disposed to be opposite to the first film, a first electrode on the first film, a second electrode below the second film and a viewing angle varying layer between the first electrode and the second electrode. The viewing angle varying layer includes a plurality of first structures and a plurality of second structures including colored particles and disposed to be spaced apart from each other.

At least one or more of a height, a width, and a shape of the plurality of first structures and the plurality of second structures is different.

The plurality of first structures and the plurality of second structures may be alternately disposed.

The first electrode may be disposed so as to overlap all the plurality of first structures and the plurality of second structures. The second electrode may include a plurality of first sub electrodes which overlaps the plurality of first structures and a plurality of second sub electrodes which overlaps the plurality of second structures.

The viewing angle varying film may further include a plurality of lenses on the second film.

A refractive index of the plurality of lenses may be 1.4 to 1.7. Centers of the plurality of lenses may be aligned between the plurality of first sub electrodes and the plurality of second sub electrodes.

An alignment direction of the colored particles may be changed depending on whether to apply a voltage to the first electrode and the second electrode.

The plurality of first structures and the plurality of second structures may have rectangular cross-sections and the plurality of first structures and the plurality of second structures may have the same widths and different heights.

The viewing angle varying layer may further include a plurality of third structures including colored particles and disposed to be spaced apart from the plurality of first structures and the plurality of second structures. The plurality of third structures may have a rectangular cross-section. The plurality of third structures may have the same width as the plurality of first structures and the plurality of second structures and have a different height from those of the plurality of first structures and the plurality of second structures.

The plurality of first structures and the plurality of second structures may have rectangular cross-sections. The plurality of first structures and the plurality of second structures may have the same heights and different widths.

The viewing angle varying layer may further include a plurality of third structures including colored particles and disposed to be spaced apart from the plurality of first structures and the plurality of second structures. The plurality of third structures may have a rectangular cross-section. The plurality of third structures may have the same height as the plurality of first structures and the plurality of second structures and have a different width from those of the plurality of first structures and the plurality of second structures.

One of the plurality of first structures and the plurality of second structures may have a rectangular cross-section and the other one may have a trapezoidal cross-section. The plurality of first structures and the plurality of second structures may have the same heights.

One of the plurality of first structures and the plurality of second structures may have a rectangular cross-section and the other one may have a trapezoidal cross-section. A height of the one of the plurality of first structures and the plurality of second structures may be lower than a height of the other one structure.

The plurality of first structures and the plurality of second structures may have trapezoidal cross-sections.

One of side surfaces of the plurality of first structures and the plurality of second structures may be vertical to a bottom surface and the other one may be inclined with respect to the bottom surface.

An inclined surface of the plurality of first structures and an inclined surface of the plurality of second structures may be opposite to each other.

Shapes of the plurality of first structures and the plurality of second structures may be symmetrical to each other.

An inclined surface of the plurality of first structures may be opposite to a vertical side surface of the plurality of second structures. An inclined surface of the plurality of second structures may be opposite to a vertical side surface of the plurality of first structures.

The inclined surface of the plurality of first structures and the inclined surface of the plurality of second structures may have different inclinations.

The viewing angle varying layer may further include a plurality of third structures and a plurality of fourth structures including colored particles and disposed to be spaced apart from the plurality of first structures and the plurality of second structures. The plurality of third structures may be formed to be symmetrical to the plurality of first structures. The plurality of fourth structures may be formed to be symmetrical to the plurality of second structures.

According to an aspect of the present disclosure, there is provided a display device. The display device includes a viewing angle varying film and a liquid crystal display panel disposed above or below the viewing angle varying film.

According to an aspect of the present disclosure, there is provided a display device. The display device includes a viewing angle varying film and an organic light emitting display panel disposed below the viewing angle varying film.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A viewing angle varying film, comprising:
   a first film;
   a second film that overlaps the first film and is spaced apart from the first film;
   a first electrode on the first film;
   a second electrode on the second film such that the second electrode is between the second film and the first electrode; and
   a viewing angle varying layer between the first electrode and the second electrode, the viewing angle varying layer including a plurality of first structures and a plurality of second structures that are spaced apart from each other and each of the plurality of first structures and each of the plurality of second structures including colored particles,
   wherein at least one or more of a height, a width, or a shape of a first structure from the plurality of first structures is respectively different from a height, a width, or a shape of a second structure from the plurality of second structures.

2. The viewing angle varying film according to claim 1, wherein the plurality of first structures and the plurality of second structures are alternately disposed.

3. The viewing angle varying film according to claim 2, wherein the first electrode overlaps the plurality of first structures and the plurality of second structures, and the second electrode includes:
  a plurality of first sub electrodes that overlap the plurality of first structures without overlapping the plurality of second structures; and
  a plurality of second sub electrodes that overlap the plurality of second structures without overlapping the plurality of first structures.

4. The viewing angle varying film according to claim 3, further comprising:
  a plurality of lenses on the second film such that the second film is between the plurality of lenses and the second electrode,
  wherein a refractive index of the plurality of lenses is in a range from 1.4 to 1.7, and a center of each of the plurality of lenses is aligned with a space between a corresponding first sub electrode from the plurality of first sub electrodes and a corresponding second sub electrode from the plurality of second sub electrodes that is adjacent to the corresponding first sub electrode.

5. The viewing angle varying film according to claim 1, wherein the colored particles have a first alignment direction while a voltage is not applied to the first electrode and the second electrode and the colored particles have a second alignment direction that is different from the first alignment direction while the voltage is applied to the first electrode and the second electrode.

6. The viewing angle varying film according to claim 1, wherein each of the plurality of first structures and each of the plurality of second structures have a rectangular cross-section, a width of each of the plurality of first structures is a same as a width of each of the plurality of second structures, and a length of each of the plurality of first structures is different from a length of each of the plurality of second structures.

7. The viewing angle varying film according to claim 6, wherein the viewing angle varying layer further comprises:
  a plurality of third structures including colored particles, the plurality of third structures spaced apart from the plurality of first structures and the plurality of second structures,
  wherein each of the plurality of third structures has a rectangular cross-section, and each of the plurality of third structures has a width that is a same as the width of each of the plurality of first structures and the width of each of the plurality of second structures, and has a height that is different from the height of each of the plurality of first structures and the height of each of the plurality of second structures.

8. The viewing angle varying film according to claim 1, wherein each of the plurality of first structures and each of the plurality of second structures have a rectangular cross-section, a height of each of the plurality of first structures is a same as a height of each of the plurality of second structures, and a width of each of the plurality of first structures is different from a width of each of the plurality of second structures.

9. The viewing angle varying film according to claim 8, wherein the viewing angle varying layer further comprises:
  a plurality of third structures including colored particles, the plurality of third structures spaced apart from the plurality of first structures and the plurality of second structures,
  wherein each of the plurality of third structures has a rectangular cross-section, and a height of each of the plurality of third structures is a same as a height of each of the plurality of first structures and a height of each of the plurality of second structures, and a width of each of the plurality of third structures is different from a width of each of the plurality of first structures and a width of each of the plurality of second structures.

10. The viewing angle varying film according to claim 1, wherein one of the plurality of first structures and the plurality of second structures has a rectangular cross-section and the other one of the plurality of first structures and the plurality of second structures has a trapezoidal cross-section, and a height of each of the plurality of first structures is a same as a height of each of the plurality of second structures.

11. The viewing angle varying film according to claim 1, wherein one of the plurality of first structures and the plurality of second structures has a rectangular cross-section and the other one of the plurality of first structures and the plurality of second structures has a trapezoidal cross-section, and a height of the one of the plurality of first structures and the plurality of second structures having the rectangular cross-section is less than a height of the other one structure of the plurality of first structures and the plurality of second structures having the trapezoidal cross-section.

12. The viewing angle varying film according to claim 1, wherein each of the plurality of first structures and the plurality of second structures have a trapezoidal cross-section,
  wherein a first side surface of each of the plurality of first structures is vertical with respect to a bottom surface of each of the plurality of first structures, a first side surface of each of the plurality of second structures is vertical with respect to a bottom surface of each of the plurality of second structures, a second side surface of each of the plurality of first structures is inclined with respect to the bottom surface of each of the plurality of first structures and a second side surface of each of the plurality of second structures is inclined with respect to the bottom surface of each of the plurality of second structures.

13. The viewing angle varying film according to claim 12, wherein the inclined second side surface of a first structure from the plurality of first structures and the inclined second side surface of a second structure of the plurality of second structures are opposite to each other.

14. The viewing angle varying film according to claim 12, wherein a shape of the plurality of first structures and a shape of the plurality of second structures are symmetrical to each other.

15. The viewing angle varying film according to claim 12, wherein the inclined second side surface of a first structure from the plurality of first structures is opposite to the vertical first side surface of a second structure from the plurality of second structures, and the inclined second side surface of the second structure is opposite to the vertical first side surface of the first structure.

16. The viewing angle varying film according to claim 15, wherein the inclined second side surface of the first structure and the inclined second side surface of the second structure have different inclinations.

17. The viewing angle varying film according to claim 15, wherein the viewing angle varying layer further comprises:

a plurality of third structures and a plurality of fourth structures that each include colored particles, the plurality of third structures and the plurality of fourth structures are spaced apart from the plurality of first structures and the plurality of second structures, wherein the plurality of third structures are symmetrical with the plurality of first structures and the plurality of fourth structures are symmetrical with the plurality of second structures.

18. A display device comprising:
a display panel configured to emit light; and
a viewing angle varying film on the display panel, the viewing angle varying film including a plurality of first structures and a plurality of second structures that are spaced apart from each other, and each of the plurality of first structures and each of the plurality of second structures including colored particles,
wherein in a first mode of the display device, the plurality of first structures and the plurality of second structures are configured to block the light emitted by the display panel from passing through the plurality of first structures and the plurality of second structures,
wherein in a second mode of the display device, the plurality of first structures and the plurality of second structures are configured to allow the light emitted by the display panel to pass through the plurality of first structures and the plurality of second structures, and
wherein in a third mode of the display device, at least one first structure from the plurality of first structures or at least one second structure from the plurality of second structures is configured to allow the light emitted by the display panel to pass through the at least one first structure or the at least one second structure at a first viewing angle, and the other one of the at least one first structure or the at least one second structure is configured to block the light emitted by the display panel.

19. The display device according to claim 18, wherein during the first mode, the colored particles included in the plurality of first structures and the colored particles included in the plurality of second structures are oriented in a first direction that blocks the light emitted from the display panel from passing through the plurality of first structures and the plurality of second structures.

20. The display device according to claim 19, wherein during the second mode, the colored particles included in the plurality of first structures and the colored particles included in the plurality of second structures are oriented in a second direction that is different from the first direction and allows the light emitted from the display panel to pass through the plurality of first structures and the plurality of second structures.

21. The display device according to claim 20, wherein during the third mode, the colored particles included in the at least one first structure or the colored particles included in the at least one second structure are oriented in the first direction and the colored particles included in the other one of the at least one first structure or the at least one second structure are oriented in the second direction.

22. The display device according to claim 21, wherein the viewing angle varying film further comprises:
a first film;
a second film that overlaps the first film and is spaced apart from the first film;
a first electrode on the first film;
a second electrode on the second film such that the second electrode is between the second film and the first electrode; and
a viewing angle varying layer between the first electrode and the second electrode, the viewing angle varying layer including the plurality of first structures and the plurality of second structures,
wherein at least one or more of a height, a width, or a shape of a first structure from the plurality of first structures is respectively different from a height, a width, or a shape of a second structure from the plurality of second structures.

23. The display device according to claim 22, wherein the first electrode overlaps the plurality of first structures and the plurality of second structures, and the second electrode includes:
a plurality of first sub electrodes that overlap the plurality of first structures without overlapping the plurality of second structures; and
a plurality of second sub electrodes that overlap the plurality of second structures without overlapping the plurality of first structures.

24. The display device according to claim 23, wherein the colored particles have the first direction while a voltage is not applied to the first electrode and the second electrode, and the colored particles have the second direction while the voltage is applied to the first electrode and the second electrode.

25. The display device of claim 18, wherein the display panel is a liquid crystal display panel or an organic light emitting display panel.

* * * * *